(12) United States Patent
Hao et al.

(10) Patent No.: US 8,631,043 B2
(45) Date of Patent: Jan. 14, 2014

(54) METHOD AND APPARATUS FOR GENERATING A SHAPE GRAPH FROM A BINARY TRIE

(75) Inventors: Fang Hao, Morganville, NJ (US);
Muralidharan Kodialam, Marlboro, NJ (US); Tirunell V. Lakshman, Morganville, NJ (US); Haoyu Song, Edison, NJ (US)

(73) Assignee: Alcatel Lucent, Paris (FR)

( * ) Notice: Subject to any disclaimer, the term of this patent is extended or adjusted under 35 U.S.C. 154(b) by 390 days.

(21) Appl. No.: 12/633,845

(22) Filed: Dec. 9, 2009

(65) Prior Publication Data

US 2011/0137930 A1    Jun. 9, 2011

(51) Int. Cl.
    *G06F 17/30* (2006.01)
(52) U.S. Cl.
    USPC ............................ 707/797; 707/796; 707/798
(58) Field of Classification Search
    None
    See application file for complete search history.

(56) References Cited

U.S. PATENT DOCUMENTS

| | | | | |
|---|---|---|---|---|
| 5,926,101 A | * | 7/1999 | Dasgupta | 370/408 |
| 2003/0236968 A1 | * | 12/2003 | Basu et al. | 712/225 |

OTHER PUBLICATIONS

Tanhermhong et al. A Structure-Shared Trie Compression Method. 2001.*
Shishibori, et al. An efficient method of compressing binary tries. Systems, Man, and Cybernetics, 1996., IEEE International Conference on, vol. 3, No., pp. 2133-2138 vol. 3, Oct. 14-17, 1996.*
Mian Pan and Haibin Lu. Build shape-shifting tries for fast IP lookup in O(n) time. Computer Communications 30(18): 3787-3795 (2007).*
U.S. Appl. No. 12/482,533, filed Jun. 11, 2009, Hao et al.
Haoyu Song et al., "Scalable IP Lookups Using Shape Graphs," 17th IEEE International Conference on Network Protocols, Oct. 13-16, 2009, Princeton, NJ.
Burton H. Bloom, "Space/Time Trade-offs in Hash Coding With Allowable Errors," Communications of the ACM, vol. 13, No. 7, Jul. 1970, pp. 422-426.
Fang Hao et al., "Fast Dynamic Multiset Membership Testing Using Combinatorial Bloom Filters," IEEE INFOCOM 2009 Proceedings, pp. 513-521.
Florin Baboescu et al., "A Tree Based Router Search Engine Architecture With Single Port Memories," Proceedings of the 32nd International Symposium on Computer Architecture (ISCA'05).
Haoyu Song et al., "Shape Shifting Tries for Faster IP Route Lookup," Proceedings of the 13th IEEE International Conference on Network Protocols (ICNP'05).

(Continued)

*Primary Examiner* — Syed Hasan
(74) *Attorney, Agent, or Firm* — Wall & Tong, LLP

(57) ABSTRACT

A capability is provided for representing a set of data values using data structures, including converting a binary trie data structure representing the set of data values to a shape graph data structure representing the set of data values. The shape graph data structure is generated from the binary trie data structure based on the shapes of the sub-trees rooted at the nodes of the binary trie data structure. The shape graph includes vertices representing shapes of the sub-trees of the binary trie data structure. A shape graph data structure permits operations similar to the operations that may be performed on the binary trie data structure for performing lookups for data values from the set of data values, while at the same time reducing the structural redundancy of the binary trie data structure such that the shape graph data structure provides significant improvements in memory usage over the binary trie data structure.

20 Claims, 14 Drawing Sheets

(56) References Cited

OTHER PUBLICATIONS

Mei Wang et al., "Non-Random Generator for IPv6 Tables," 12$^{th}$ IEEE HotInterconnects, 2004, pp. 35-40.

Marcel Waldvogel et al., "Scalable High Speed IP Routing Lookups," ACM SIGCOMM, 1997 Cannes, France, pp. 25-36.

V. Srinivasan, George Varghese, "Faster IP Lookups Using Controlled Prefix Expansion," ACM SIGMETRICS, 1998, Madison, WI, pp. 1-10.

Francis Chang et al., "Approximate Caches for Packet Classification," IEEE INFOCOM, 2004.

Andrei Broder, Michael Mitzenmacher, "Using Multiple Hash Functions to Improve IP Lookups," IEEE INFOCOM 2001, pp. 1454-1463.

Sarang Dharmapurikar, et al., "Longest Prefix Matching Using Bloom Filters," ACM SIGCOMM'03, Aug. 25-29, 2003, Karlsruhe, Germany, pp. 201-212.

Mikael Degermark, et al., "Small Forwarding Tables for Fast Routing Lookups," ACM SIGCOMM, 1997 Cannes, France. pp. 3-14.

Bernard Chazelle et al., "The Bloomier Filter: An Efficient Data Structure for Static Support Lookup Tables," ACM—SIAM Symposium on Discrete Algorithms (SODA), 2004.

Weirong Jiang, et al., "Beyond TCAMs: An SRAM-based Parallel Multi-Pipeline Architecture for Terabit IP Lookup," IEEE INFOCOM 2008 Proceedings, pp. 2458-2466.

Jahangir Hasan, et al., "Dynamic Pipelining: Making IP-Lookup Truly Scalable," SIGCOMM'05, Aug. 21-26, 2005, Philadelphia, PA, pp. 205-216.

Jing Fu, et al., "Efficient IP-Address Lookup with a Shared Forwarding Table for Multiple Virtual Routers," ACM CoNEXT 2008, Dec. 9-12, 2008, Madrid, Spain.

Will Eatherton, et al., "Tree Bitmap: Hardware/Software IP Lookups with Incremental Updates," ACM SIGCOMM Computer Communications Review, vol. 34, No. 2, Apr. 2004, pp. 97-122.

Yi Lu et al., "Bloom Filters: Design Innovations and Novel Applications," Allerton Conference, 2005.

Sailesh Kumar et al., "Peacock Hashing: Deterministic and Updatable Hashing for High Performance Networking," IEEE INFOCOM 2008 Proceedings, pp. 556-564.

Haoyu Song et al., "Fast Hash Table Lookup Using Extended Bloom Filter: An Aid to Network Processing," SIGCOMM'05, Aug. 22-26, 2005, Philadelphia, PA, pp. 181-192.

Sailesh Kumar et al., "Algorithms to Accelerate Multiple Regular Expressions Matching for Deep Packet Inspection," SIGCOMM'06, Sep. 11-15, 2006, Pisa, Italy, pp. 339-350.

Sailesh Kumar et al., "CAMP: Fast and Efficient IP Lookup Architecture," ANCS'06, Dec. 3-5, 2006, San Jose, CA, pp. 51-60.

Stefan Nilsson, et al., "IP-Address Lookup Using LC-Tries," IEEE Journal on Selected Areas in Communications, vol. 17, No. 6, Jun. 1999, pp. 1083-1092.

Jan van Lunteren, "Searching Very Large Routing Tables in Wide Embedded Memory," IEEE GLOBECOM, 2001, pp. 1615-1619.

Haoyu Song, et al., "IPv6 Lookups Using Distributed and Load Balanced Bloom Filters for 100Gbps Core Router Line Cards," IEEE INFOCOM 2009 Proceedings.

* cited by examiner

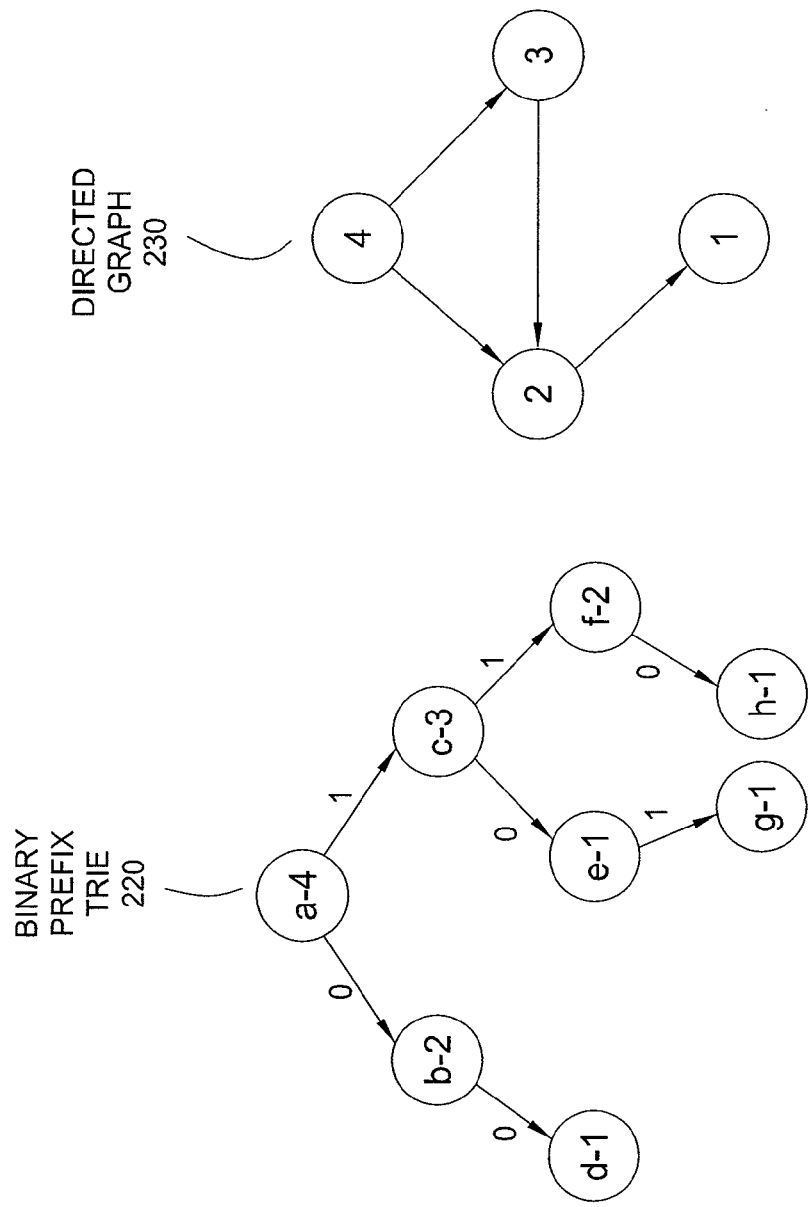

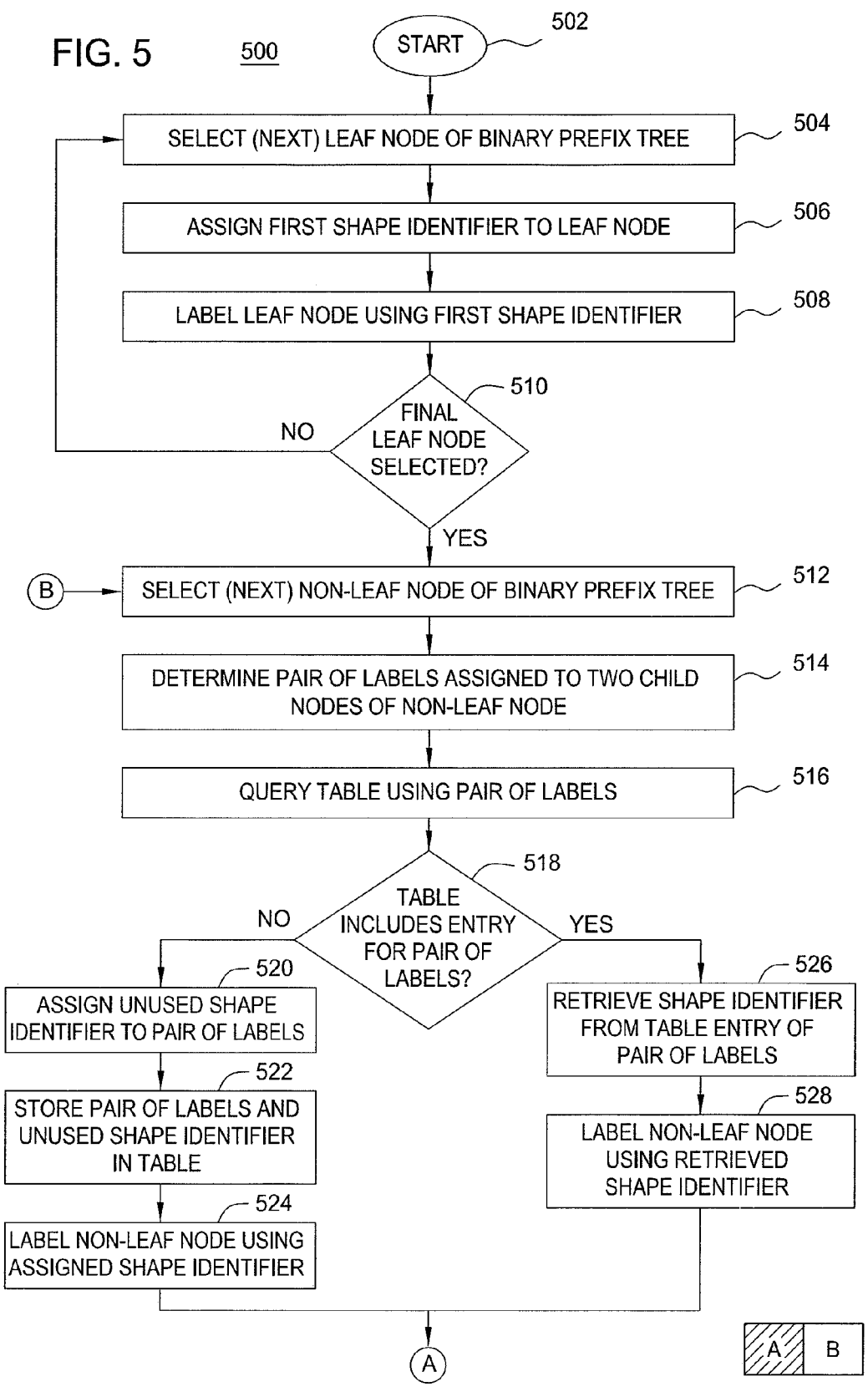

600

700

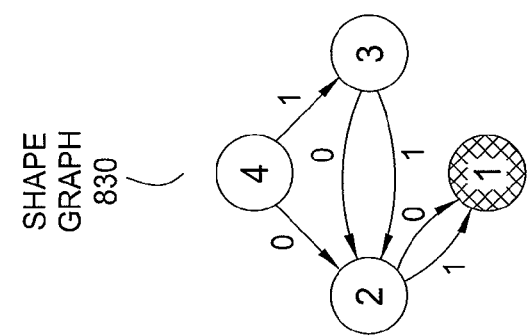
FIG. 8C
| PREFIX | NEXT HOP |
|---|---|
| 00* | P1 |
| 01* | P0 |
| 100* | P0 |
| 101* | P3 |
| 110* | P4 |
| 111* | P2 |
IP PREFIX TABLE 810
FIG. 8B
SHAPE GRAPH 830
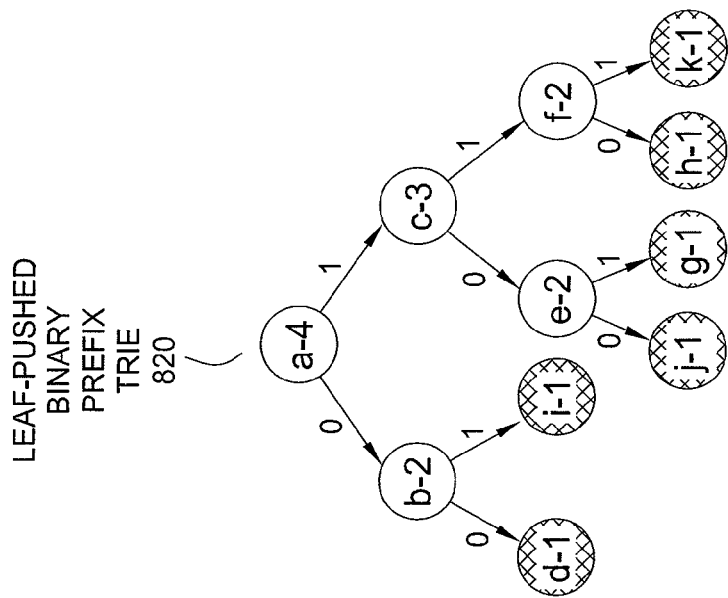
FIG. 8A
LEAF-PUSHED BINARY PREFIX TRIE 820

METHOD AND APPARATUS FOR GENERATING A SHAPE GRAPH FROM A BINARY TRIE

FIELD OF THE INVENTION

The invention relates generally to data structures and, more specifically but not exclusively, to converting one type of data structure to another type of data structure.

BACKGROUND

In the field of high-speed packet processing, there is a renewed interest in developing memory-efficient data structures for packet processing functions, such as for performing longest IP prefix matching for IP packet forwarding. This renewed interest is motivated by several factors that necessitate the use of memory-efficient data structures. First, the expected transition to 100 Gbps interfaces requires the use of memory-efficient data structures in order to achieve good performance while minimizing high-speed memory costs. Second, growth of forwarding table sizes and the need to forward IPv6 packets both increase the importance of achieving high efficiencies in memory usage. Third, multi-core processors are increasingly being employed for performing packet forwarding and, in systems using such multi-core processors, good performance is achieved by storing entire packet forwarding data structures in on-chip caches, which requires the use of highly memory-efficient data structures. Finally, the growing use of network virtualization, in which a physical router may operate as multiple virtual routers and each of the multiple virtual routers maintains a copy of the forwarding data structures, requires use of memory-efficient data structures by each of the multiple virtual routers. Disadvantageously, however, the existing longest IP prefix matching schemes all tend to consume a large amount of memory and, therefore, are not suitable for use in satisfying the factors described above.

SUMMARY

Various deficiencies in the prior art are addressed by embodiments that support representation of a set of data values using data structures, including conversion of a binary trie data structure representing the set of data values to a shape graph data structure representing the set of data values. The shape graph data structure is generated from the binary trie data structure based on the shapes of the sub-trees rooted at the nodes of the binary trie data structure. The shape graph data structure includes vertices representing shapes of the sub-trees of the binary trie data structure. The shape graph data structure includes edges for traversing the shape graph data structure. A shape graph data structure permits operations similar to the operations that may be performed on the binary trie data structure for performing lookups for data values from the set of data values, while at the same time reducing the structural redundancy of the binary trie data structure such that the shape graph data structure provides significant improvements in memory usage over the binary trie data structure.

In one embodiment, a method for generating a shape graph from a binary trie includes using a processing for constructing the shape graph by determining, for each of a plurality of nodes of the binary trie, a shape of a sub-tree rooted at the node, and constructing the shape graph from the binary trie based on the shapes of the sub-trees rooted at the nodes of the binary trie.

In one embodiment, a method for performing a lookup for identifying a matching data value from a set of data values represented using a binary trie includes traversing a shape graph for identifying the matching data value and determining the matching data value based at least in part on traversal of the shape graph, where the shape graph includes a plurality of vertices representing a respectively plurality of unique shapes of sub-trees rooted at nodes of the binary trie and a plurality of edges between the vertices.

BRIEF DESCRIPTION OF THE DRAWINGS

The teachings herein can be readily understood by considering the following detailed description in conjunction with the accompanying drawings, in which:

FIG. 2A depicts the exemplary binary prefix trie of FIG. 1B, labeled with isomorphic sub-tree shape identifiers;

FIG. 2B depicts a directed graph for the exemplary binary prefix trie of FIG. 2A;

FIG. 8A depicts an exemplary leaf-pushed binary prefix trie after leaf pushing is applied to the exemplary binary prefix trie of FIG. 3A;

FIG. 8B depicts an exemplary shape graph for the exemplary leaf-pushed binary prefix trie of FIG. 8A;

FIG. 8C depicts the exemplary IP prefix table for the exemplary leaf-pushed binary prefix trie of FIG. 8A and the exemplary shape graph of FIG. 8B;

DETAILED DESCRIPTION OF THE INVENTION

Figures 1A, 1B:
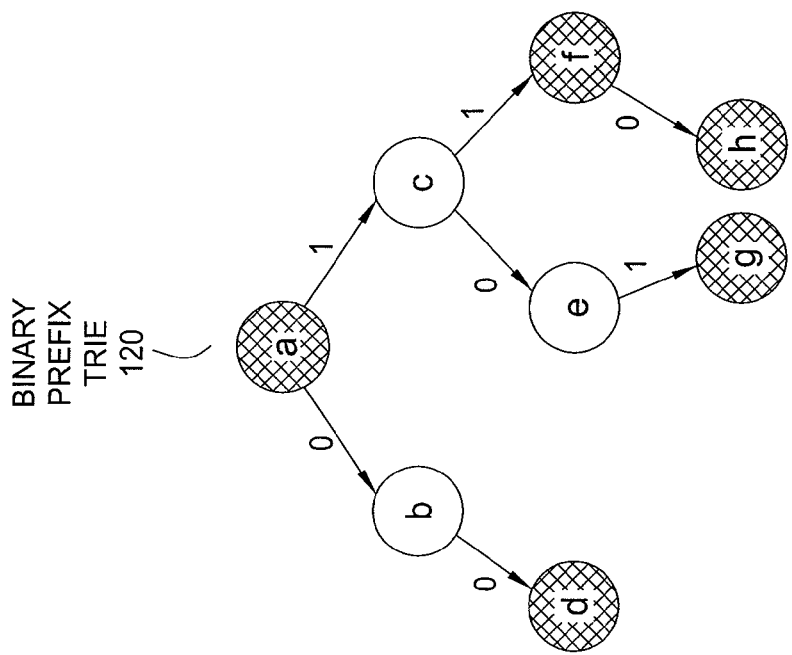
FIG. 1A depicts an exemplary IP prefix table.
FIG. 1B depicts the exemplary binary prefix trie for the IP prefix table of FIG. 1A.

A capability for supporting representation of a set of data values using data structures is depicted and described herein. This capability includes supporting conversion of a binary trie data structure representing the set of data values to a shape graph data structure representing the set of data values and, thus, may be referred to herein as a shape graph capability. The shape graph is generated from the binary trie based on the shapes of sub-trees rooted at the nodes of the binary trie. A shape graph permits operations similar to the operations that may be performed on the binary trie for performing lookups for data values from the set of data values, while at the same time reducing the structural redundancy of the binary trie such that the shape graph provides significant improvements in memory usage over the binary trie. A shape graph may be formed as a single-bit shape graph, or as a multi-bit shape graph that allows examination of multiple bits per memory access to improve data value lookup throughput. A shape graph may be implemented by applying a leaf pushing technique to the binary trie, thereby enabling further improvements in both memory consumption and data value lookup throughput.

In order to provide a more detailed description of the shape graph capability, the shape graph capability is primarily depicted and described herein within the context of one particular application of the shape graph capability, namely, use of the shape graph capability to represent a set of IP prefixes of an IP prefix trie using a shape graph and to use the shape graph to identify matching IP prefixes for use in performing IP lookups. It will be appreciated, however, that the shape graph capability is suitable for use for any applications in which data values may be represented using a tree-based data structure. For example, the shape graph capability may be used for networking applications (e.g., for use in performing IP prefix matching on IP addresses, for use with tree-based packet classification algorithms (e.g., HiCuts, HyperCuts, and the like), for use with Deterministic Finite Automaton (DFA)-based pattern matching algorithms (e.g., the Aho-Corasick algorithm and other such algorithms), and the like), computer science applications, and the like. In other words, although primarily depicted and described within the context of use of the shape graph capability to represent a set of IP prefixes for use in performing IP lookups, the shape graph capability is not intended to be limited to this application. Thus, references herein to binary prefix tries may be read more generally as binary tries and, similarly, other terms used herein to describe the shape graph capability within the context of representing a set of IP prefixes of an IP prefix trie using a shape graph also may be read more generally.

The use of the shape graph capability to represent a set of IP prefixes of an IP prefix trie using a shape graph generated from the IP prefix trie, and to use the shape graph to perform IP lookups based on IP addresses, may be better understood by first considering an IP prefix table and associated binary prefix trie from which a shape graph may be derived.

FIG. 1A depicts an exemplary IP prefix table 110. The exemplary IP prefix table 110 includes a plurality of entries for a respective plurality of IP prefixes, where each entry includes an IP prefix and a next-hop node that is associated with the IP prefix. The exemplary IP prefix table 110 includes five entries as follows: IP prefix * maps to next-hope node P0, IP prefix 00* maps to next-hop node P1, IP prefix 11* maps to next-hop node P2, IP prefix 101* maps to next-hop node P3, and IP prefix 110* maps to next-hop node P4. It will be appreciated that an IP prefix table may include any suitable number of entries including IP prefixes having any suitable lengths.

FIG. 1B depicts the exemplary binary prefix trie for the IP prefix table of FIG. 1A.

In general, a binary trie data structure includes nodes and associated edges that define transitions between the nodes. The edges of the binary trie data structure enable traversal of the binary trie data structure for identifying matching values in the binary trie data structure.

In general, binary trie data structures are natural data structures for performing longest IP prefix matching needed for IP packet processing. The binary trie data structure is used to represent the set of IP prefixes over which longest IP prefix matching is performed. In this manner, traversal of the binary trie data structure using a portion of an IP address of an IP packet enables identification of the longest IP prefix associated with the IP address, which may then be used to perform other IP lookups, such as for determining a next-hop node to which the IP packet is to be forwarded.

As depicted in FIG. 1B, the exemplary binary prefix trie 120 represents the set of IP prefixes of the IP prefix table 110 of FIG. 1A, i.e., the set of IP prefixes over which longest IP prefix matching is performed. In this manner, the exemplary binary prefix trie 120 provides a data structure which, when traversed using a portion of an IP address of an IP packet, enables identification of a longest IP prefix match for the IP address of the IP packet which may then be used to determine a next-hop node for the IP packet using the IP prefix table 110 of FIG. 1A.

As depicted in FIG. 1B, exemplary binary prefix trie 120 includes eight nodes (illustratively, denoted as nodes "a" through "h"), which are arranged using four hierarchical levels. The exemplary binary prefix trie 120 also includes edges (also referred to as branches) between the nodes, which define transitions between the nodes. The exemplary binary prefix trie 120 is arranged such that a node "a" is the root of exemplary binary prefix trie 120, node "a" has a 0-branch child node "b" (i.e., when at node "a", an input value of "0" causes a transition from node "a" to node "b") and a 1-branch child node "c" (i.e., when at node "a", an input value of "1" causes a transition from node "a" to node "c"), node "b" has a 0-branch child node "d" (i.e., when at node "b", an input value of "0" causes a transition from node "b" to node "d"), node "c" has a 0-branch child node "e" (i.e., when at node "c", an input value of "0" causes a transition from node "c" to node "e") and a 1-branch child node "f" (i.e., when at node "c", an input value of "1" causes a transition from node "c" to node "f"), node "e" has a 1-branch child node "g" (i.e., when at node "e", an input value of "1" causes a transition from node "e" to node "g"), and node "f" has a 0-branch child node "h" (i.e., when at node "f", an input value of "0" causes a transition from node "f" to node "h").

As depicted in FIG. 1B, in exemplary binary prefix trie 120 the shaded nodes indicate the valid IP prefixes of IP prefix table 110, namely: node "a" (prefix *), node "d" (prefix 00*), node "f" (prefix 11*), node "g" (prefix 101*), and node "h" (prefix 110*).

For example, searching for the longest IP prefix for bit sequence 0110 will result in identification of IP prefix * (indicated by node "a" at the root of exemplary binary prefix trie 120), since although traversal of exemplary binary prefix trie 120 based on the first bit of the bit sequence will cause a shift to node "b" which is the 0-branch child of node "a", there is no corresponding 1-branch child of node "b".

Similarly, for example, searching for the longest IP prefix for bit sequence 1101 will result in identification of IP prefix 110* (indicated by node "h" which is a leaf of exemplary binary prefix trie 120), since traversal of exemplary binary prefix trie 120 based on the first three bits of the bit sequence will cause shifts from node "a" to node "c" (which is the 1-branch child of node "a", from node "c" to node "f" (which is the 1-branch child of node "c", and from node "f" to node "h" (which is the 0-branch child of node "f" and also is a leaf of exemplary binary prefix trie 120).

In general, at each hierarchical level of a binary prefix trie, the number of isomorphic sub-trees is much less than the number of trie nodes of the binary prefix trie, such that a count of the total number of isomorphic sub-trees in the binary prefix trie is much less than the trie size of the binary prefix trie (i.e., much less than the total number of trie nodes in the binary prefix trie). As a general definition, two trees are considered to be isomorphic if by switching the left and right child nodes of a node, along with the sub-trees at which they are rooted, the two tree become identical.

As depicted in FIG. 1B, exemplary binary prefix trie 120 includes eight nodes arranged in four hierarchical levels. In exemplary binary prefix trie 120, the single-node sub-trees rooted at nodes "d", "g", and "h" are isomorphic because they are identical (i.e., there is no sub-tree because these are the leaf nodes), the sub-trees rooted at nodes "b", "e", and "f" are isomorphic, and the sub-trees rooted at nodes "e" and "f" are isomorphic because if the left-child of node "f" is switched to being the right-child then the two-sub-trees become identical.

As such, although the exemplary binary prefix trie 120 includes eight nodes, exemplary binary prefix trie 120 includes only four unique isomorphic sub-trees and, thus, the number of unique isomorphic sub-trees is 50% of the number of trie nodes. While this difference between the number of trie nodes and the number of isomorphic sub-trees is not quite dramatic for exemplary IP prefix table 110 and exemplary binary prefix trie 120, the difference becomes much more dramatic when considering tries constructed from real IP prefix data. For example, testing the difference on a binary prefix trie constructed from a snapshot of the BGP AS1221 prefix table, it was determined that the IP prefix table has 210K IPv4 prefixes and that the associated binary prefix trie has 576,534 nodes, but that the binary prefix trie includes only 48,762 unique isomorphic sub-trees such that number of unique isomorphic sub-trees is 8% of the number of trie nodes. Additionally, similar comparisons performed on other IP prefix tables yields similar dramatic differences between the number of nodes in the binary prefix trie and the number of unique isomorphic sub-trees in the binary prefix trie.

As described herein, this observation that the number of isomorphic sub-trees in the binary prefix trie is significantly less than the number of nodes of the binary prefix trie may be exploited in order to significantly reduce the memory requirements associated with performing IP prefix matching.

In one embodiment, the binary prefix tree is transformed into a directed graph using structural similarities of isomorphic sub-trees of the binary prefix trie, thereby producing a directed graph that is more compact than the binary prefix trie and, thus, more memory efficient than the binary prefix trie. In this embodiment, in which an assumption is made that the binary prefix trie includes n trie nodes and k isomorphic sub-tree groups, the following steps may be performed in order to transform the binary prefix trie into a directed graph: (1) each trie node of the binary prefix trie is labeled with a unique sub-tree identifier of the isomorphic sub-tree rooted at that trie node, and (2) a directed graph of k vertices is constructed, where each of the k vertices represents one of the isomorphic sub-trees in the binary prefix trie, and (3) edges are added to the directed graph, between the vertices of the directed graph, based on the relationships of the corresponding isomorphic sub-trees of the binary prefix trie. An example is depicted in FIG. 2A and FIG. 2B.

FIG. 2A depicts the exemplary binary prefix trie of FIG. 1B, labeled with isomorphic sub-tree shape identifiers.

As depicted in FIG. 2A, exemplary binary prefix trie 220 is identical to exemplary binary prefix trie 120 of FIG. 1B in arrangement of the trie nodes, with isomorphic sub-tree shape identifiers being labeled thereon. In exemplary binary prefix trie 220 (as in exemplary binary prefix trie 120), the sub-trees rooted at nodes "d", "g", and "h" are isomorphic (and, thus, each of these nodes is labeled using an isomorphic sub-tree shape identifier of "1"), the sub-trees rooted at nodes "b", "e", and "f" are isomorphic (and, thus, each of these nodes is labeled using an isomorphic sub-tree shape identifier of "2"), the sub-tree rooted at node "c" does not have any associated isomorphic sub-tree counterpart (and, thus, this node is labeled using an isomorphic sub-tree shape identifier of "3"), and the sub-tree rooted at node "a" does not have any associated isomorphic sub-tree counterpart (and, thus, this node is labeled using an isomorphic sub-tree shape identifier of "4").

FIG. 2B depicts a directed graph for the exemplary binary prefix trie of FIG. 2A.

As depicted in FIG. 2B, directed graph 230 includes four vertices, labeled as "1", "2", "3", and "4" (corresponding to the isomorphic sub-tree shape identifiers with which exemplary binary prefix trie 220 is labeled). The directed graph 230 includes edges between the vertices as follows: an edge from vertex "4" to vertex "3", an edge from vertex "3" to vertex "2", an edge from vertex "4" to vertex "2", and an edge from vertex "2" to vertex "1".

The edges of the directed graph 230 are determined based on the relationships between the corresponding isomorphic sub-trees of exemplary binary prefix trie 220. For example, node "a" (having label "4") has two child nodes "b" and "c" (having labels "2" and "3", respectively) such that vertex "4" of directed graph has two outgoing edges to vertices "2" and "3", respectively. Similarly, for example, node "c" (having label "3") has two child nodes "e" and "f" (having labels "2" and "2", respectively) such that vertex "3" of directed graph has only one outgoing edge to vertex "2". The other edges of directed graph 230 may be determined in a similar manner. In this manner, directed graph 230 may be constructed from exemplary binary prefix trie 220.

A directed graph resulting from transformation of a binary prefix trie has some interesting properties associated therewith, including: (1) the directed graph has only one starting vertex which maps to the root node of the binary prefix trie, and the directed graph has only one terminating vertex, which maps to all of the leaf nodes of the binary prefix trie; and (2) each vertex of the directed graph can have multiple incoming edges, but can have, at most, two outgoing edges. These properties may be deduced from the process of transforming the binary prefix trie into the directed graph, since the directed graph is the result of: (1) for each set of trie nodes having the same label assigned thereto, condensing all of the trie nodes of the set of trie nodes to a single vertex of the directed graph that is representative of that label; and (2) removing the redundant branches of the binary prefix trie.

While transformation of a binary prefix trie to a directed graph based on isomorphic sub-trees of the binary prefix trie results in a directed graph that is more memory efficient than the binary prefix trie, this transformation results in loss of information inherent in the binary prefix trie, such that the resulting directed graph may be not be suitable for use in performing IP prefix matching. For example, using a directed graph generated in this manner: (1) a reverse transformation from the directed graph to the binary prefix trie cannot be performed and, (2) traversal of the directed graph using an IP address does not result in identification of an IP prefix match for the IP address, since the edges of the directed graph lose the notion of the 0-branch and 1-branch of nodes of the binary prefix trie.

In one embodiment, in order to retain such properties of a binary prefix trie, the binary prefix tree is transformed into a directed graph using structural similarities of identical sub-trees of the binary prefix trie, rather than just using structural similarities of isomorphic sub-trees of the binary prefix trie.

In this embodiment, two binary trees are identical if and only if their left sub-trees are identical and their right sub-trees are identical.

In this embodiment, since the number of identical sub-trees of the binary prefix trie is likely to be greater than the number of isomorphic sub-trees of the binary prefix trie, using structural similarities of identical sub-trees of the binary prefix trie is likely to be less memory-efficient than using structural similarities of isomorphic sub-trees of the binary prefix trie, however, using structural similarities of identical sub-trees of the binary prefix trie is still significantly more memory-efficient than using the binary prefix trie without performing any transformation to s graph structure.

For example, testing the difference on a binary prefix trie constructed from a snapshot of the BGP AS1221 prefix table, it was determined that the IP prefix table has 210K IPv4 prefixes, that the associated binary prefix trie has 576,534 nodes, that the binary prefix trie includes 48,762 unique isomorphic sub-trees, and that binary prefix trie includes 76,276 unique identical sub-trees, such that, although the number of identical sub-trees is 1.6 times larger than the number of isomorphic sub-trees, it is still 7.6 times smaller than the number of trie nodes, which indicates a significant reduction in memory usage when a directed graph generated from a binary prefix trie based on unique identical sub-trees of the binary prefix trie is used in place of the binary prefix trie. Additionally, similar comparisons performed on other IP prefix tables yields similar dramatic differences between the number of nodes in the binary prefix trie and the number of unique identical sub-trees in the binary prefix trie.

Thus, as with a directed graph that is generated based on isomorphic sub-trees of a binary prefix trie, a directed graph that is generated based on identical sub-trees of a binary prefix trie is more compact than the binary prefix trie and, thus, more memory efficient than the binary prefix trie, while also retaining properties of the binary prefix trie which enable traversal of the directed graph to perform IP prefix matching.

In this embodiment, in which a binary prefix tree is transformed into a directed graph using structural similarities of identical sub-trees of the binary prefix trie, the directed graph is referred to as a shape graph because the identical sub-trees of the binary prefix tree map to unique sub-tree shapes associated with sub-trees of the binary prefix trie.

Figure 3B:
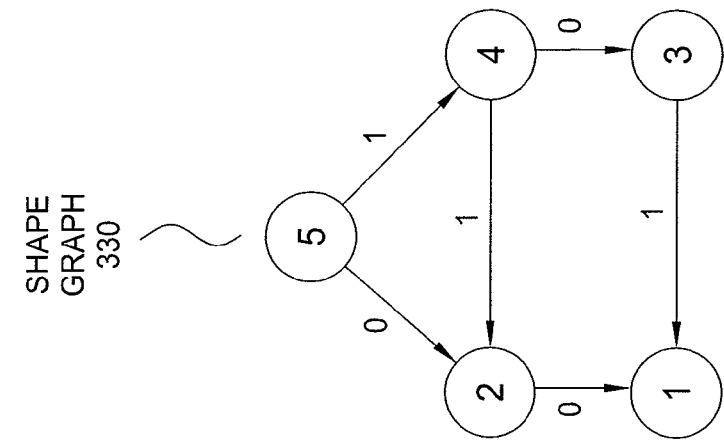
FIG. 3B depicts a shape graph for the exemplary binary prefix trie of FIG. 3A.

In this embodiment, in which an assumption is made that the binary prefix trie includes n trie nodes and k unique sub-tree shapes, the following steps may be performed in order to transform the binary prefix trie into a shape graph: (1) each trie node of the binary prefix trie is labeled with a shape identifier indicative of the shape of the sub-tree rooted at that trie node, (2) a shape graph of k vertices is constructed, where each of the k vertices represents one of the k unique sub-tree shapes in the binary prefix trie, and (3) edges are added to the shape graph, between the vertices of the shape graph, based on the relationships of the corresponding sub-trees of the binary prefix trie. An example is depicted in FIG. 3A and FIG. 3B.

As described herein, two binary trees are identical if and only if their left sub-trees are identical and their right sub-trees are identical. Furthermore, since each node of the binary prefix trie is labeled with the shape identifier corresponding to the shape of the sub-tree rooted thereat, it follows that two binary trees may be deemed to be identical if and only if their left child nodes have the same label (i.e., shape identifier) and their right child nodes have the same label (i.e., shape identifier).

Figure 3A:
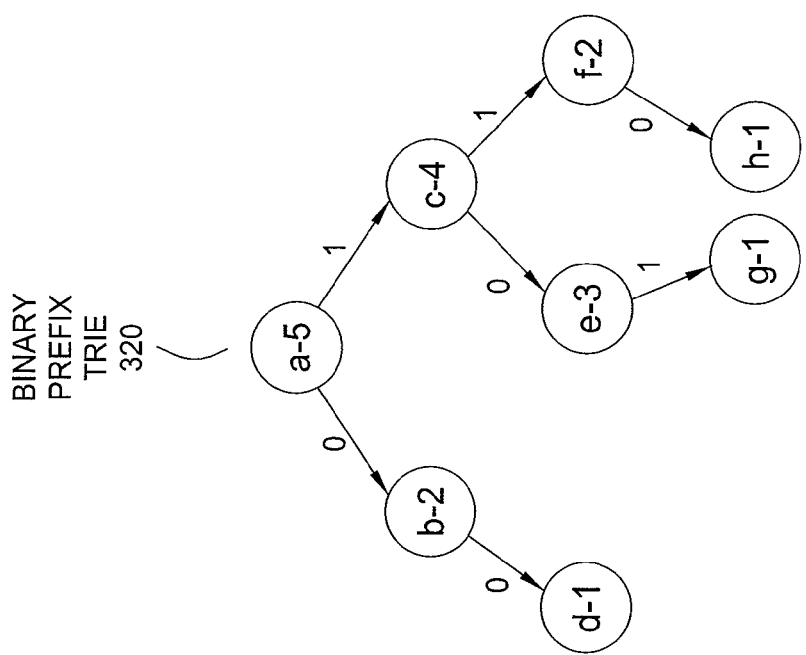
FIG. 3A depicts the exemplary binary prefix trie of FIG. 1B, labeled with identical sub-tree shape identifiers.

FIG. 3A depicts the exemplary binary prefix trie of FIG. 1B, labeled with identical sub-tree shape identifiers.

As depicted in FIG. 3A, exemplary binary prefix trie 320 is identical to exemplary binary prefix trie 120 of FIG. 1B and exemplary binary prefix trie 220 of FIG. 2A, respectively, in arrangement of the trie nodes; however, unlike exemplary binary prefix trie 220 which has four isomorphic sub-tree identifiers labeled thereon, exemplary binary prefix trie 320 has five identical sub-tree identifiers labeled thereon. In exemplary binary prefix trie 320, the sub-trees rooted at nodes "d", "g", and h" have identical shapes (and, thus, each of these nodes is labeled using a sub-tree shape identifier of "1"), the sub-trees rooted at nodes "b" and "f" have identical shapes (and, thus, each of these nodes is labeled using a sub-tree shape identifier of "2"), the shape of the sub-tree rooted at node "e" is unique (and, thus, this node is labeled using a sub-tree shape identifier of "3"), the shape of the sub-tree rooted at node "c" is unique (and, thus, this node is labeled using a sub-tree shape identifier of "4"), and the shape of the sub-tree rooted at node "a" is unique (and, thus, this node is labeled using a sub-tree shape identifier of "5").

FIG. 3B depicts a shape graph for the exemplary binary prefix trie of FIG. 3A.

As depicted in FIG. 3B, shape graph 330 includes five vertices, labeled as "1", "2", "3", "4", and "5" (corresponding to the sub-tree shape identifiers with which exemplary binary prefix trie 320 is labeled). The shape graph 330 includes edges between the vertices as follows: a 1-edge from vertex "5" to vertex "4" and a 0-edge from vertex "5" to vertex "2", a 1-edge from vertex "4" to vertex "2" and a 0-edge from vertex "4" to vertex "3", a 1-edge from vertex "3" to vertex "1", and a 0-edge from vertex "2" to vertex "1", where a 0-edge indicates that a bit of "0" triggers a transition along the edge and a 1-edge indicates that a bit of "1" triggers a transition along the edge.

The edges of the shape graph 330 are determined based on the relationships between the corresponding sub-trees of exemplary binary prefix trie 320. For example, node "a" (having label "5") has two child nodes "b" and "c" (having labels "2" and "4", respectively) such that vertex "5" of directed graph has two outgoing edges to vertices "2" and "4", respectively, including the trigger conditions for the edges (namely, a bit of "0" triggers a transition from vertex "5" to vertex "2" and a bit of "1" triggers a transition from vertex "5" to vertex "4"). Similarly, for example, node "c" (having label "4") has two child nodes "e" and "f" (having labels "3" and "2", respectively) such that vertex "4" of directed graph has two outgoing edges to vertices "2" and "3", respectively, including the trigger conditions for the edges (namely, a bit of "0" triggers a transition from vertex "4" to vertex "3" and a bit of "1" triggers a transition from vertex "4" to vertex "2"). The other edges of shape graph 330 may be determined in a similar manner. In this manner, shape graph 330 may be constructed from exemplary binary prefix trie 320.

As described herein, and as may be seen from the example of FIG. 3A and FIG. 3B, a shape graph generated from a binary prefix trie using identical sub-trees inherits all of the properties of a directed graph generated from a binary prefix trie using isomorphic sub-trees, while at the same time preserving additional information from the binary prefix trie from which the shape graph is generated. For example, in a shape graph each vertex (with the exception of the terminating vertex) has two ordered outgoing edges which map to the 0-branch and 1-branch of the trie nodes of the binary prefix trie, such that: (1) the binary prefix trie may be recovered from the shape graph alone (i.e., reverse transformations are possible) and (2) traversal of the directed graph using an IP address results in identification of an IP prefix match for the IP address.

Thus, use of a shape graph to perform IP prefix matching is a memory-efficient alternative to use of the binary prefix trie to perform IP prefix matching.

Figure 4:
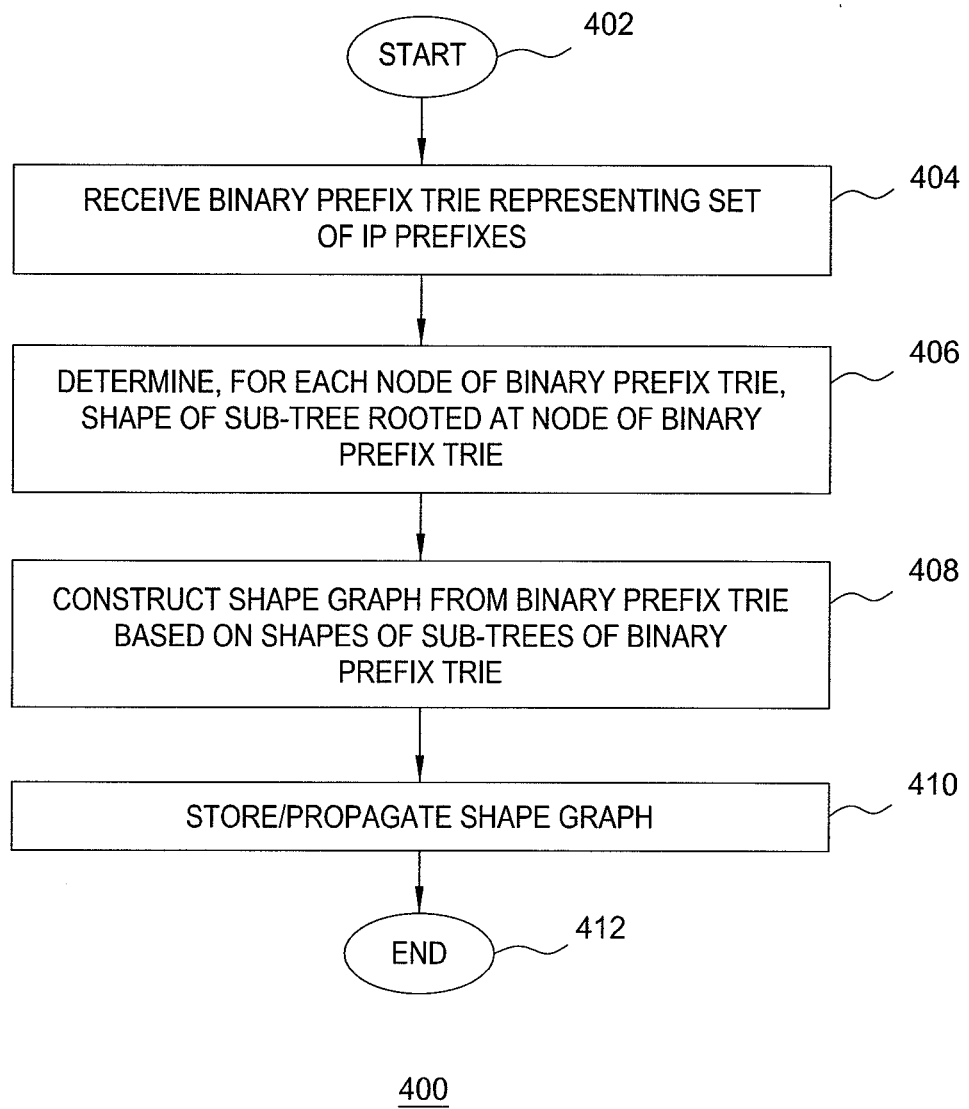
FIG. 4 depicts one embodiment of a method for generating a shape graph using a binary prefix trie.

FIG. 4 depicts one embodiment of a method for generating a shape graph using a binary prefix trie. Although primarily depicted and described as being performed serially, at least a portion of the steps of method 400 may be performed contemporaneously, or in a different order than depicted and described with respect to FIG. 4.

At step 402, method 400 begins.

At step 404, a binary prefix trie is received.

The binary prefix trie may be received from any suitable source of such information. In one embodiment, for example, in which the method 400 is executed by a network device which will use the shape graph in performing IP lookups (e.g., such as a router), the binary prefix trie may be received from a local memory of the network device. In one embodiment, for example, in which the method 400 is executed by a system different than the network device that will use the shape graph in performing IP lookups (e.g., such as a management system), the binary prefix trie may be received from a memory of the system (e.g., internal or external storage), from the network device that will use the shape graph in performing IP lookups, or from any other suitable source of such information.

The binary prefix trie may be generated prior to being received. The binary prefix trie may be generated in any suitable manner, e.g., using information indicating a set of IP prefixes supported by the network device which will use the shape graph in performing IP lookups. The information indicating a set of IP prefixes supported by the network device which will use the shape graph in performing IP lookups may be determined from any suitable source of such information, e.g., from a list of IP prefixes of an IP prefix table of the network device or from any other suitable source of such information.

Although depicted and described as being received, the binary prefix trie may simply be available for processing for use in constructing the shape graph from the binary prefix trie, such that an explicit step of receiving the binary prefix trie is not required.

At step 406, for each node of the binary prefix trie, a sub-tree shape of the sub-tree rooted at the node of the binary prefix trie is determined. The sub-tree shapes of the sub-trees rooted at the respective nodes of the binary prefix trie may be determined in any suitable manner. In one embodiment, the nodes of the binary prefix trie are labeled in a manner for indicating the shapes of the sub-trees rooted at the nodes of the binary prefix trie, respectively, to form thereby a labeled binary prefix trie. In one embodiment, determining of the shapes of the sub-trees of the binary prefix trie and labeling of the nodes of the binary prefix tree to form the labeled binary prefix trie is performed in parallel. In one embodiment, determining of the shapes of the sub-trees of the binary prefix trie and labeling of the nodes of the binary prefix tree to form the labeled binary prefix trie is performed using a single-pass traversal of the binary prefix trie. An exemplary embodiment for determining of the shapes of the sub-trees of the binary prefix trie and labeling the nodes of the binary prefix tree to form the labeled binary prefix trie in a single-pass traversal of the binary prefix trie is depicted and described with respect to FIG. 5.

At step 408, a shape graph is constructed for the binary prefix trie based on the shapes of the sub-trees rooted at the nodes of the binary prefix trie, respectively. The shape graph may be constructed in any suitable manner. In one embodiment, in which the nodes of the binary prefix trie are labeled to form a labeled binary prefix trie, the shape graph is constructed by allocating a plurality of vertices for the shape graph and traversing the labeled binary prefix trie in a manner for determining a plurality of edges to be set between the vertices of the shape graph. In this embodiment, the labeled binary prefix trie may be traversed in any suitable manner. An exemplary embodiment for traversing a labeled binary prefix trie to construct a shape graph is depicted and described with respect to FIG. 6.

At step 410, the shape graph is stored and/or propagated. In one embodiment, for example, in which the method 400 is executed by a network device which will use the shape graph in performing IP lookups (e.g., such as a router), the binary prefix trie is stored in a local memory of the network device. In one embodiment, for example, in which the method 400 is executed by a system different than the network device that will use the shape graph in performing IP lookups (e.g., such as a management system), the binary prefix trie is propagated toward the network device that will use the shape graph in performing IP lookups such that the shape graph may be stored in a local memory of the network device (and, optionally, the shape graph also may be stored by the system that constructs the shape graph). In this manner, the shape graph is made available to the network device for use in performing IP lookups at the network device.

At step 412, method 400 ends.

Figure 5:
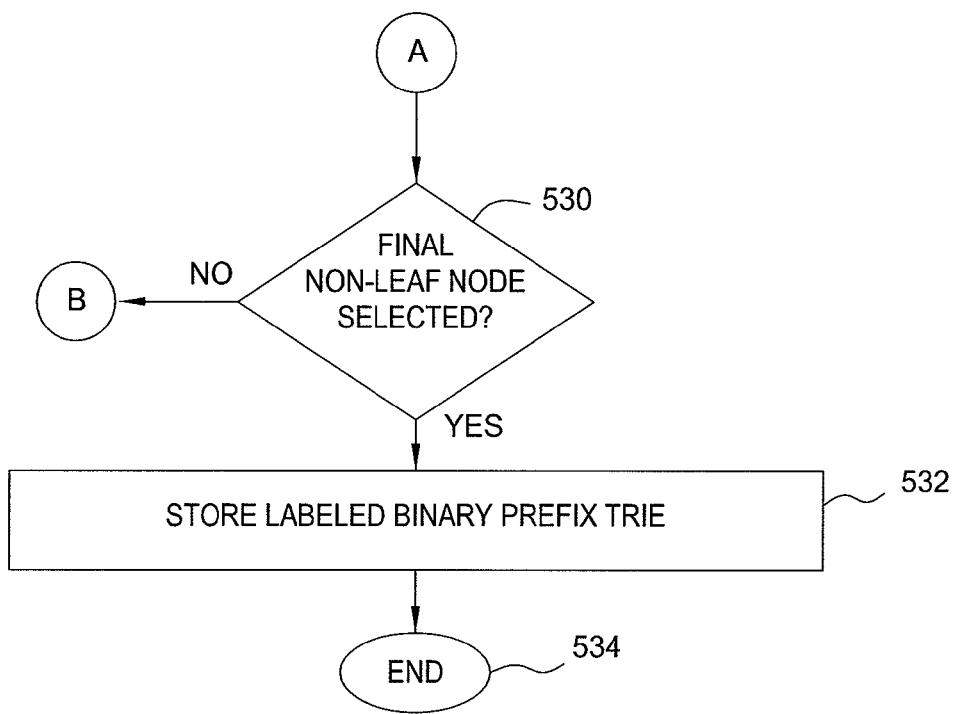
FIG. 5 depicts one embodiment of a method for forming a labeled binary prefix trie in a single-pass traversal of the binary prefix trie.

FIG. 5 depicts one embodiment of a method for forming a labeled binary prefix trie in a single-pass traversal of the binary prefix trie. Although primarily depicted and described as being performed serially, at least a portion of the steps of method 500 may be performed contemporaneously, or in a different order than depicted and described with respect to FIG. 5.

Although omitted for purposes of clarity, one or more initialization steps may be performed for method 500, such as steps of initializing the value of the first shape identifier (e.g., to "1" or any other suitable value), initializing a counter adapted for use in incrementing the shape identifier as new sub-tree shapes are identified in the binary prefix trie, initializing a table adapted for use in labeling the binary prefix trie with the shape identifiers, and the like, as well as combinations thereof.

At step 502, method 500 begins.

At step 504, a (next) leaf node of the binary prefix trie is selected.

At step 506, a first shape identifier is assigned to the leaf node. The first shape identifier may be any identified suitable for use in identifying the sub-tree shape common to all of the leaf nodes of the binary prefix trie (i.e., namely, that the sub-trees of the leaf nodes are null sub-trees because none of the leaf nodes have any child nodes associated therewith).

At step 508, the leaf node of the binary prefix tree is labeled using the first shape identifier.

At step 510, a determination is made as to whether the final leaf node of the binary prefix trie has been selected. If the final leaf node has not been selected, method 500 returns to step 504, at which point a next leaf node of the binary prefix trie is selected. If the final leaf node has been selected, method 500 proceeds to step 512 to begin traversal of the non-leaf nodes of the binary prefix trie.

At step 512, a (next) non-leaf node of the binary prefix trie is selected.

At step 514, a pair of labels assigned to the two child nodes of the non-leaf node is determined. If a child node of the non-leaf node exists in the binary prefix trie, the label of the child node is determined from the child node (i.e., the label is the shape identifier assigned to that child node when that node was processed). If a child node of the non-leaf node does not exist in the binary prefix tree, a null shape identifier is used as the label (e.g., a null shape identifier of "0", or any other suitable value).

At step 516, a table is queried using the pair of labels of the non-leaf node.

At step 518, a determination is made as to whether the table includes an entry for the pair of labels of the non-leaf node. If the table does not include an entry for the pair of labels of the non-leaf node, method 500 proceeds to step 520. If the table does include an entry for the pair of labels of the non-leaf node, method 500 proceeds to step 526.

At step 520, an unused shape identifier is assigned to the pair of labels of the non-leaf node. The unused shape identifier that is assigned may be selected in any suitable manner. For example, the shape identifiers may be any types of values suitable for use in labeling nodes of the binary prefix trie in a manner for indicating the shapes of the sub-trees rooted at the nodes of the binary prefix trie, respective (e.g., using integers, letters, and the like). In one embodiment, for example, where shape identifiers are integers, the shape identifiers may be assigned incrementally, e.g., beginning with "1" (which is used for the leaf nodes) and being incremented by one for each unique sub-tree shape identified within the binary prefix trie. The shape identifiers may be assigned in any other suitable manner.

At step 522, the pair of labels and the assigned shape identifiers are stored in the table. The pair of labels and the assigned shape identifier are stored in the table in a manner for associating the assigned shape identifier with the pair of labels, such that subsequent searches of the table using the same pair of labels results in identification of the same shape identifier. The pair of labels and the assigned shape identifier may be associated in any suitable manner (e.g., by creating a new entry in the table that maps the pair of labels to the assigned shape identifier or in any other suitable manner).

At step 524, the non-leaf node of the binary prefix tree is labeled using the assigned shape identifier. From step 524, method 500 proceeds to step 530.

At step 526, a shape identifier associated with the pair of labels is retrieved from the table (e.g., from an entry in the table that maps the pair of labels to an associated shape identifier).

At step 528, the non-leaf node of the binary prefix tree is labeled using the retrieved shape identifier. From step 528, method 500 proceeds to step 530.

At step 530, a determination is made as to whether the final non-leaf node of the binary prefix trie has been selected. If the final non-leaf node has not been selected, method 500 returns to step 512, at which point a next non-leaf node of the binary prefix trie is selected. If the final non-leaf node has been selected, method 500 proceeds to step 532.

At step 532, the labeled binary prefix trie is stored. The labeled binary prefix trie may be stored in any suitable format. The labeled binary prefix trie may be stored in any suitable location (e.g., at the network device for which the shape graph is being generated, at a system generating the shape graph for the network device, or in any other suitable location). Although depicted as a separate step, it will be appreciated that storage of the labeled binary prefix trie may be achieved during execution of method 500 where the stored binary prefix trie is incrementally labeled to form the labeled binary prefix trie which is already stored in memory.

At step 534, method 500 ends.

Although omitted for purposes of clarity, one or more initialization steps may be performed before and/or during execution of the method 500, such as steps of: (1) initializing a counter or other suitable construct adapted for use in traversing the binary prefix trie using a post-order traversal, (2) initializing the value of the first shape identifier that is used to label each of the leaf nodes of the binary prefix trie (e.g., initializing the first shape identifier to "1" or to any other suitable value), (3) initializing a counter adapted for use in incrementing the shape identifier as new sub-tree shapes are identified and labeled in the binary prefix trie, (4) initializing a table adapted for use in labeling the binary prefix trie with shape identifiers, and the like, as well as combinations thereof.

Although omitted for purposes of clarity, it will be appreciated that the order in which the nodes of the binary prefix trie are selected for traversing the binary prefix trie may be any suitable order.

Although primarily described with respect to embodiments in which the sub-tree shape identifiers used to label the binary prefix trie are integers from 1 through k, where k is the total number of unique sub-tree shapes within the binary prefix trie, it will be appreciated that the sub-tree shape identifiers may be implemented using any other suitable values.

The operation of method 500 of FIG. 5 may be better understood by way of reference to the exemplary binary prefix trie 120 of FIG. 1B and the exemplary binary prefix trie 320 of FIG. 3A, where exemplary binary prefix trie 120 of FIG. 1A is traversed and labeled to form exemplary binary prefix trie 320 of FIG. 3A. For example, the exemplary binary prefix trie 120 of FIG. 1 may be traversed using a post-order traversal in the following order of nodes: d-b-g-e-h-f-c-a. The leaf nodes "d", "g", and "h" are all considered to have identical sub-trees (i.e., null sub-trees) and, as such, are each labeled using the same shape identifier ("1"). For each of the non-leaf nodes, the labels of the two child nodes of the non-leaf node are identified for determining a pair of labels of the non-leaf node. If a child node does not exist, an assumption is made that the non-existent child has a null shape identifier ("0") assigned thereto. The pair of labels is used as a key to query a hash table, where: if the key is not in the hash table, the key is stored in the hash table along with the next unused shape identifier r, and the current non-leaf node is labeled with shape number r; or, if the key is in the hash table, the value of the shape identifier that is associated with the key is retrieved from the hash table used to label the non-leaf node.

In this example, the first non-leaf node that is encountered during the traversal of the binary prefix trie is node "b". The pair of labels for node "b" is {1,0} because the left child of node "b" (namely, node "d") has a label of "1" and there is no right child of node "b". The only entry in the hash table at this point is for label pair {0,0} associated with each leaf node (which has shape identifier of "1" associated therewith). With respect to node "b", since the label pair {1,0} is not in the hash table, label pair {1,0} is added to the hash table, the next unused shape identifier ("2") is assigned to label pair {1,0} and associated therewith in the hash table, and the assigned shape identifier associated with label pair {1,0} is used to label node "b" of the binary prefix trie, as depicted in FIG. 3A.

In this example, the second non-leaf node that is encountered during the traversal of the binary prefix trie is node "e". The pair of labels for node "e" is {0,1} because there is no left child node of node "e" and the right child of node "e" (namely, node "d") has a label of "1". There are two entries in the hash table at this point: one for label pair {0,0} associated with each leaf node (which has shape identifier of "1" associated therewith) and one for label pair {1,0} (which has a shape identifier of "2" associated therewith. With respect to node e, since the label pair {0,1} is not in the hash table, label pair {0,1} is added to the hash table, the next unused shape identifier ("3") is assigned to label pair {0,1} and associated therewith in the hash table, and the assigned shape identifier associated with label pair {0,1} is used to label node "e" of the binary prefix trie, as depicted in FIG. 3A.

In this example, the third non-leaf node that is encountered during the traversal of the binary prefix trie is node "f". The pair of labels for node "f" is {1,0} because the left child of node "f" (namely, node "h") has a label of "1" and there is no right child of node "f". There are three entries in the hash table at this point: one for label pair {0,0} associated with each leaf node (which has shape identifier of "1" associated therewith), one for label pair {1,0} (which has a shape identifier of "2" associated therewith, and one for label pair {0,1} (which has a shape identifier of "3" associated therewith. With respect to node "f", since the label pair {0,1} is already in the hash table, the label pair {0,1} is identified in the hash table, the associated shape identifier of label pair {0,1} (namely, "2") is retrieved from that entry of the hash table, and the retrieved shape identifier associated with label pair {0,1} is used to label node "f" of the binary prefix trie, as depicted in FIG. 3A.

In this example, the traversal of the binary prefix trie is continued until the nodes of the binary prefix trie have been labeled with associated shape identifiers.

In this manner, exemplary binary prefix trie 120 of FIG. 1B is labeled to form exemplary labeled binary prefix trie 320 of FIG. 3A. Additionally, since the shape identifiers are assigned using consecutive integers, the label that is assigned to the root node of the labeled binary prefix trie is indicative of the number of unique sub-tree shapes present in the binary prefix trie and, thus, the number of vertices to be included within the shape graph constructed from the labeled binary prefix trie.

Figure 6:
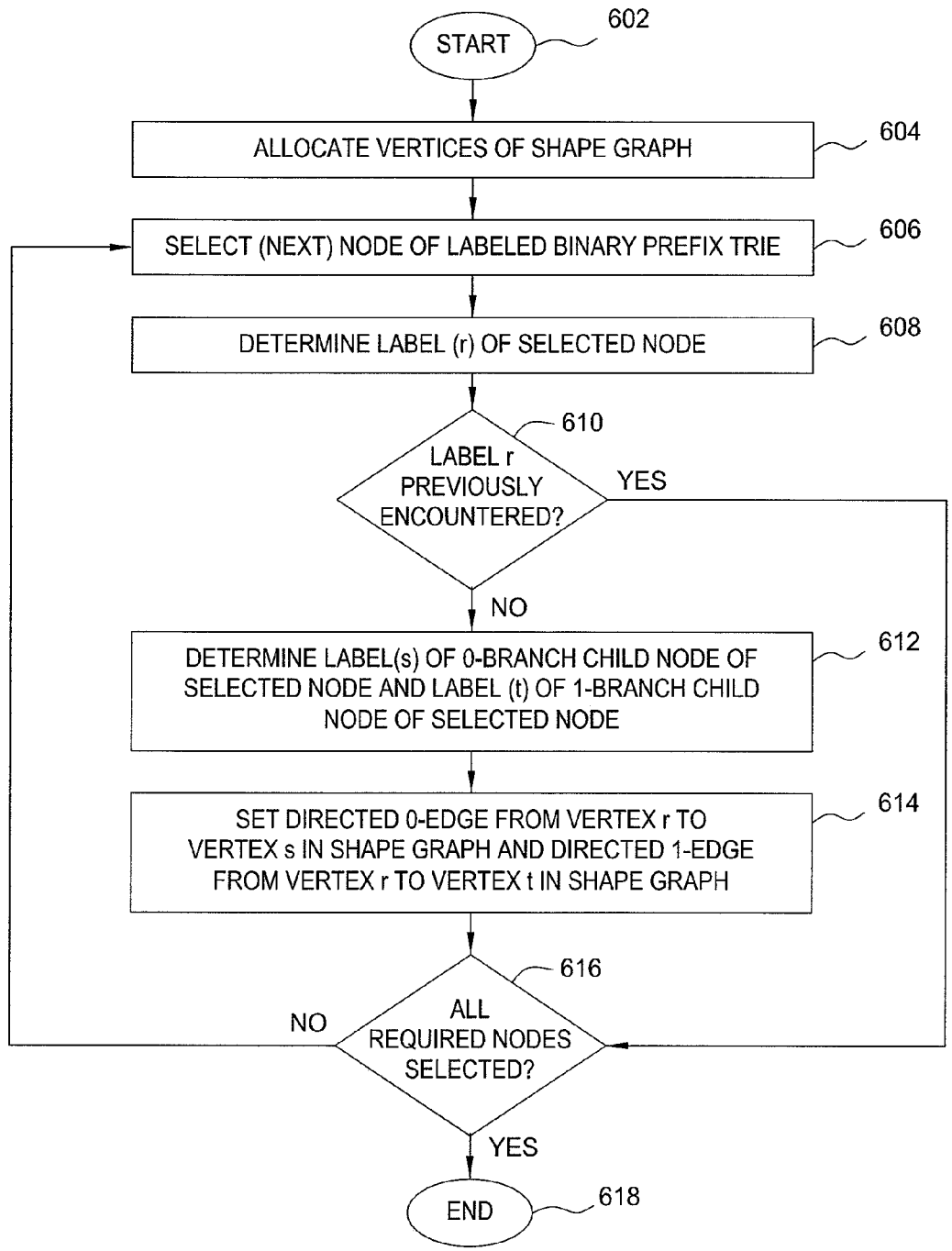
FIG. 6 depicts one embodiment of a method for traversing a labeled binary prefix trie during construction of a shape graph for the binary prefix trie.

FIG. 6 depicts one embodiment of a method for traversing a labeled binary prefix trie during construction of a shape graph for the binary prefix trie. Although primarily depicted and described as being performed serially, at least a portion of the steps of method 600 may be performed contemporaneously, or in a different order than depicted and described with respect to FIG. 6.

At step 602, method 600 begins.

At step 604, a set of vertices of the shape graph is allocated. The number of vertices of the shape graph is equal to the number of sub-tree shapes of the binary prefix trie (e.g., one vertex is allocated for each unique sub-tree shape in the binary prefix trie). In an embodiment in which the shape identifiers are assigned as integers, consecutively beginning with "1", the label of the root of the labeled binary prefix trie is equal to the number of vertices that must be allocated for the shape graph. The vertices of the shape graph may be allocated such that each vertex has an identifier associated therewith. The vertex identifiers of the vertices of the shape graph may utilize any suitable vertex identifiers (e.g., using the shape identifiers used to label the nodes of the binary prefix trie or any other suitable vertex identifiers).

At step 606, a (next) node of the labeled binary prefix trie is selected.

At step 608, a label (r) of the selected node is determined from the selected node.

At step 610, a determination is made as to whether or not the label (r) of the selected node has been encountered already (i.e., has previously been encountered during this execution of the method 600).

If the label (r) of the selected node has been encountered already, method 600 proceeds to step 616. If the label (r) of the selected node has not been encountered already, method 600 proceeds to step 612.

At step 612, the label (s) of the 0-branch child node of the selected node is determined and the label (t) of the 1-branch child node of the selected node is determined. The labels s and t are determined from the labeled binary prefix trie.

At step 614, a directed 0-edge from vertex r to vertex s is set in the shape graph and a directed 1-edge from vertex r to vertex t is set in the shape graph. From step 614, method 600 proceeds to step 616.

At step 616, a determination is made as to whether all required nodes of the labeled binary prefix trie have been selected.

In one embodiment, construction of the shape graph is performed by traversing all nodes of the labeled binary prefix trie, such that this may be a determination as to whether all nodes of the whether all nodes of the labeled binary prefix trie have been selected for processing.

In one embodiment, construction of the shape graph is performed by attempting to traverse only a subset of the nodes of the labeled binary prefix trie (e.g., by terminating traversal of the labeled binary prefix trie as soon as all k of the shape identifiers have been accessed), such that this may be a determination as to whether all k of the shape identifiers have been accessed at least once each.

If all required nodes of the labeled binary prefix trie have not been selected, method 600 returns to step 606, at which point a next node of the binary prefix trie is selected. If all required nodes of the labeled binary prefix trie have been selected, method 600 proceeds to step 618.

At step 618, method 600 ends.

The operation of method 600 of FIG. 6 may be better understood by way of reference to the exemplary binary prefix trie 320 of FIG. 3A and the exemplary shape graph 330 of FIG. 3B, where exemplary binary prefix trie 320 of FIG. 3A is traversed to construct exemplary shape graph 330 of FIG. 3B. The shape graph is initialized, and k vertices of the shape graph are allocated, where k is the number of unique sub-tree shapes in the exemplary labeled binary prefix trie 320 (which, in this example, is "5"). The exemplary binary prefix trie 320 may be traversed in any order. In general, for a node of the labeled binary prefix trie visited during the traversal: if the label r of the node has been encountered already, no further action is taken for that node, or if the label r of the node has not been encountered already, the labels of the 0-branch and 1-branch child nodes are determined from the labeled binary prefix trie and associated edges are set in the shape graph accordingly.

In this example, assume that the first node that is traversed is node "a" having a label of "5". In this case, since label "5" has not been encountered yet, the label of the 0-branch child node of node "a" is determined to be node "b" having a label of "2" and the 1-branch and the 1-branch child node of node "a" is determined to be node "c" having a label of "4". As a result, a 0-edge from vertex "5" to vertex "2" is added to the shape graph and a 1-edge from vertex "5" to vertex "4" is added to the shape graph, as depicted in FIG. 3B.

In this example, assume that the first node that is traversed is node "a" having a label of "5". In this case, since label "5" has not been encountered yet, the label of the 0-branch child node of node "a" is determined to be node "b" having a label of "2" and the 1-branch child node of node "a" is determined to be node "c" having a label of "4". As a result, a 0-edge from vertex "5" to vertex "2" is added to the shape graph and a 1-edge from vertex "5" to vertex "4" is added to the shape graph, as depicted in FIG. 3B.

In this example, assume that the second node that is traversed is node "b" having a label of "2". In this case, since label "2" has not been encountered yet, the label of the 0-branch child node of node "b" is determined to be node "d" having a label of "1" and the 1-branch child node of node "b" is determined to be non-existent. As a result, a 0-edge from vertex "2" to vertex "1" is added to the shape graph, but no 1-edge exits from vertex "2" in the shape graph, as depicted in FIG. 3B.

In this example, assume that the third node that is traversed is node "c" having a label of "4". In this case, since label "4" has not been encountered yet, the label of the 0-branch child node of node c is determined to be node "e" having a label of "3" and the 1-branch child node of node "c" is determined to be node "f" having a label of "2". As a result, a 0-edge from vertex "4" to vertex "3" is added to the shape graph and a 1-edge from vertex "4" to vertex "2" is added to the shape graph, as depicted in FIG. 3B.

In this example, traversal of the labeled binary prefix trie continues until each of the different shape identifiers that is labeled within the labeled binary prefix trie is encountered at least once.

In this manner, exemplary binary prefix trie 320 of FIG. 3A is traversed to construct shape graph 330 of FIG. 3B.

Figure 7:
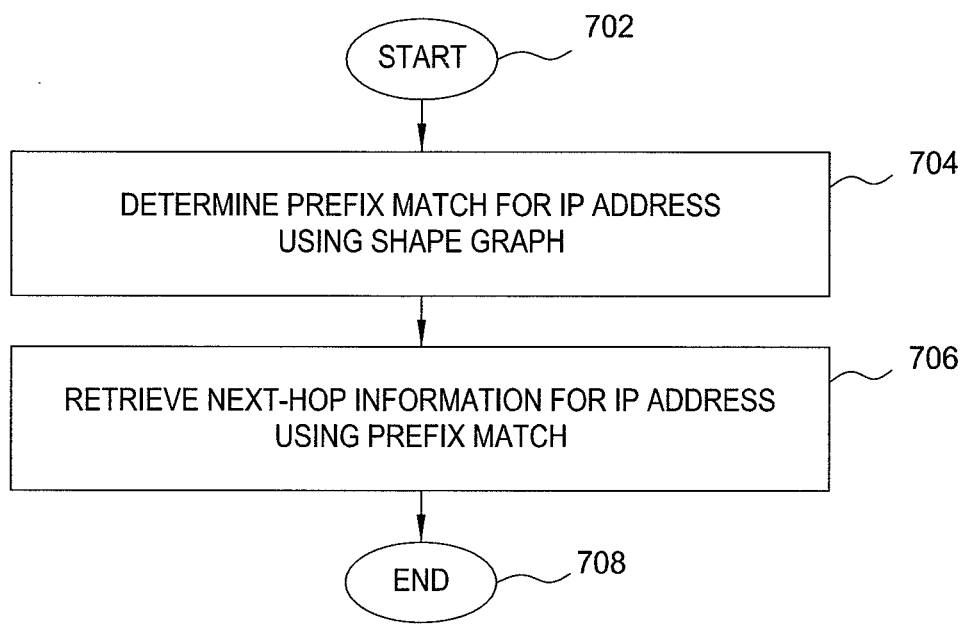
FIG. 7 depicts one embodiment of a method for using a shape graph to perform an IP lookup.

FIG. 7 depicts one embodiment of a method for using a shape graph to perform an IP lookup for an IP address. Although primarily depicted and described as being performed serially, at least a portion of the steps of method 700 may be performed contemporaneously, or in a different order than depicted and described with respect to FIG. 7.

At step 702, method 700 begins.

At step 704, a prefix match is determined for the IP address using the shape graph. The IP prefix match may be a best IP prefix match for the IP address (e.g., a longest IP prefix match or any other suitable type of IP prefix match). The IP prefix match is determined by traversing the shape graph beginning with a root vertex of the shape graph and proceeding until the prefix match is identified. The shape graph may be traversed in any manner suitable for use in identifying the prefix match from the shape graph.

At step 706, next-hop information for the IP address is retrieved using the prefix match.

The next-hop information for the IP address may be retrieved using the prefix match in any suitable manner (e.g., using a hash based lookup process, a Bloom filter based lookup process, or any other type of process suitable for retrieving next-hop information for an IP address using a prefix match that has been identified for the IP address.

The next-hop information for the IP address may include any suitable information, such as a next-hop node toward which an associated IP packet is to be forwarded, a next-hop port via which an associated IP packet is to be forwarded (e.g., toward a next-hop node), one or more packet processing rules to be applied to, or at least considered for application to, an associated IP packet, and the like, as well as combinations thereof.

At step 708, method 700 ends.

Although depicted and described as ending, it will be appreciated that further processing may be performed for the IP address using the next-hop information. For example, when the IP address is part of an IP packet and when the next-hop information identifies a next-hop node for the IP address, the IP packet may be propagated toward the next-hop node. For example, when the IP address is part of an IP packet and when the next-hop information identifies a packet processing policy to be applied for the IP address, the IP packet may be processed in accordance with the packet processing policy. It will be appreciated that many other type(s) of processing may be performed for the IP address using the next-hop information.

As described herein, the shape graph is a compressed form of the binary prefix trie from which the shape graph is constructed, and may be used for IP lookups in place of the binary prefix trie while providing a significant improvement in memory usage over the IP prefix trie.

As may be seen from the description of the shape graph capability provided above, it is possible for a vertex of a shape graph to be reachable through multiple paths of the shape graph, where some paths leading to the vertex may indicate valid prefixes while other paths leading to the vertex may not. As an example, referring to the shape graph 330 of FIG. 3B, vertex "2" actually maps to paths "0*" and "11*", where, as may be seen from IP prefix table 110 of FIG. 1A, "11*" is a valid prefix and "0*" is not a valid prefix.

Thus, in order to provide an IP lookup capability using a shape graph it may be necessary to distinguish between valid and invalid prefixes. This may be implemented in any suitable manner.

In one embodiment, the ability to distinguish between valid prefixes and invalid prefixes during IP lookups may be provided by storing with the shape graph information adapted for use in distinguishing between valid prefixes and invalid prefixes. In one embodiment, for example, the valid prefix may be stored with the vertex for comparison such that, when multiple paths through the shape graph lead to the same vertex, the valid prefix for the vertex can be determined using the information stored at the vertex. A disadvantage of such an embodiment is that it will increase the storage costs of the shape graph.

In one embodiment, the ability to distinguish between valid prefixes and invalid prefixes during IP lookups may be provided by modifying the binary prefix trie before the shape graph is constructed, such that, when the shape graph is constructed from the modified binary prefix trie, the resulting shape graph obviates the need to distinguish between valid and invalid prefixes during IP lookups. In one embodiment, for example, the binary prefix trie may be modified using a leaf pushing technique.

A desirable feature of the binary trie data structure is that any node can be reached through only one path. With respect to use of a binary prefix trie for IP lookups, this indicates that if a node of the binary prefix trie is indicated as a valid prefix node, the unique path leading the node implies the prefix (i.e., no additional information needs to be stored for the node, which can provide significant savings in terms of memory). Similarly, with respect to the shape graph, if each prefix represented by the shape graph is represented using only a single vertex then, upon reaching the vertex of a given prefix, it is known that a valid prefix has been matched and the path traversed to reach the vertex implies the valid prefix. This type of vertex is a terminating vertex, at which all paths for a given prefix converge. Since a terminating vertex of a shape graph maps to leaf nodes of the associated binary prefix trie, this desirable feature of the binary prefix trie is preserved in the shape graph by requiring that only leaf nodes of the binary prefix trie can indicate valid IP prefixes. This requirement that only leaf nodes of the binary prefix trie can indicate valid IP prefixes may be implemented by applying leaf pushing to the binary prefix trie prior to construction of the shape graph from the binary prefix trie.

In one embodiment, in which the binary prefix trie is modified using leaf pushing, modification of the binary prefix trie includes: (1) growing the binary prefix trie, determined from the set of IP prefixes, to form a full binary prefix trie (i.e., all non-leaf nodes have two child nodes each) and (2) pushing all of the IP prefixes to the leaf nodes of the full binary prefix trie. In general, use of leaf pushing is likely to reduce the number of unique sub-tree shapes in the binary prefix trie at the expense of increasing the number of IP prefixes that must be represented by the binary prefix trie. In general, the processes used for constructing a shape graph from a leaf-pushed binary prefix trie are the same as, or at least similar to, the processes used for constructing a shape graph from a binary prefix trie in which leaf-pushing is not implemented. The use of leaf pushing may be better understood by way of reference to the example of FIG. 8A-8C.

FIG. 8A depicts an exemplary leaf-pushed binary prefix trie after leaf pushing is applied to the exemplary binary prefix trie of FIG. 3A.

As depicted in FIG. 8A, three new nodes have been added to the exemplary binary prefix trie 320 of FIG. 3B, namely, nodes i (the 1-branch child of node b), j (the 0-branch child of node e), and k (the 1-branch child of node f).

As depicted in FIG. 8A, the addition of the new nodes using leaf pushing results in a more symmetrical binary prefix trie, which thereby reduces the number of unique shapes of the exemplary binary prefix trie (i.e., from five unique shapes in the exemplary binary prefix trie 320 to four unique shapes in the exemplary leaf-pushed binary prefix trie 820 of FIG. 8A). In this example, the reduction in the number of unique shapes results from the fact that leaf pushing causes nodes "b", "e", and "f" to have identically shaped sub-trees, whereas prior to leaf pushing only nodes "b" and "f" had identical sub-tree shapes.

As depicted in FIG. 8A, while the number of unique sub-tree shapes in the binary prefix trie is reduced as a result of leaf pushing, the number of valid IP prefixes represented by the binary prefix trie is increased as a result of the leaf pushing. In this example, the number of valid IP prefixes represented by the binary prefix trie is increased from five valid IP prefixes in IP prefix table 110 of FIG. 1A to six valid IP prefixes in IP prefix table 810 of FIG. 8C. The nodes of leaf-pushed binary prefix trie 820 that represent valid IP prefixes are shaded (i.e., the six leaf nodes of leaf-pushed binary prefix trie 820).

The process by which the sub-tree shapes of the binary prefix trie are determined and the nodes of the binary prefix are labeled with the determined shapes may be identical for exemplary leaf-pushed binary prefix trie 820 and exemplary binary prefix trie 320. Similarly, the process by which the shape graph is constructed also may be identical for exemplary leaf-pushed binary prefix trie 820 and exemplary binary prefix trie 320. In other words, use of leaf pushing provides additional advantages in terms of memory efficiency and IP lookup efficiency, without requiring any changes in the processes used for constructing the shape graph.

FIG. 8B depicts an exemplary shape graph for the exemplary leaf-pushed binary prefix trie of FIG. 8A.

As depicted in FIG. 8B, the shape graph 830 includes four vertices corresponding to the four unique sub-tree shapes of exemplary leaf-pushed binary prefix trie 820 of FIG. 8A. The setting of the edges between vertices of the shape graph 830 by traversing the exemplary leaf-pushed binary prefix trie 820 is performed in a manner similar to the setting of the edges between vertices of the shape graph 330 by traversing the exemplary binary prefix trie 320.

As depicted in FIG. 8B, one of the four vertices of shape graph 830 represents each of the six valid IP prefixes of the exemplary leaf-pushed binary prefix trie 820: namely, the vertex "1", which represents each of the six leaf nodes of the exemplary leaf-pushed binary prefix trie 820.

As depicted in FIG. 8B, there are six unique paths, in shape graph 830, from root vertex "4" (which represents the root node "a") to terminating vertex "4" (which represents the leaf nodes "d", "i", "j", "g", "h", and "k"). The traversal of shape graph 830 thus indicates the valid IP prefixes. The shape graph 830 may be traversed from vertex "4" to vertex "2" (via the 0-edge) and from vertex "2" to vertex "1" (via the 0-edge), which gives an IP prefix of 00*. The shape graph 830 may be traversed from vertex "4" to vertex "2" (via the 0-edge) and from vertex "2" to vertex "1" (via the 1-edge), which gives an IP prefix of 01*. The shape graph 830 may be traversed from vertex "4" to vertex "3" (via the 1-edge), from vertex "3" to vertex "2" (via the 0-edge), and from vertex "2" to vertex "1" (via the 0-branch), which gives an IP prefix of 100*. The other three IP prefixes also may be determined by parsing the other three paths of shape graph 830.

As depicted in FIG. 8A and FIG. 8B, from the exemplary leaf-pushed binary prefix trie 820 and the exemplary shape graph 830, it is apparent that use of leaf pushing results in expansion of the set of IP prefixes and, thus, also results in expansion of the associated IP prefix table.

FIG. 8C depicts the exemplary IP prefix table for the exemplary leaf-pushed binary prefix trie of FIG. 8A and the exemplary shape graph of FIG. 8B. The exemplary IP prefix table 810 includes a plurality of entries for a respective plurality of IP prefixes, where each entry includes an IP prefix and a next-hop node that is associated with the IP prefix. The exemplary IP prefix table 810 includes six entries as follows: IP prefix 00* maps to next-hope node P1, IP prefix 01* maps to next-hop node P0, IP prefix 100* maps to next-hop node P0, IP prefix 101* maps to next-hop node P3, IP prefix 110* maps to next-hop node P4, and IP prefix 111* maps to next-hop node P2.

As described hereinabove, leaf pushing expands the size of the binary prefix trie and expands the size of the IP prefix table; however, leaf pushing reduces the number of unique sub-tree shapes and, thus, reduces the size of the shape graph that is ultimately stored for use in performing IP lookups. As an example, again consider the AS1221 BGP table. When leaf pushing is applied to the AS1221 BGP table, the size of the IP prefix table increases by 1.7 times and the size of the associated binary prefix trie increases by 1.3 times; however, the number of vertices of the shape graph is reduced from 76,276 vertices to 51,962 vertices, a 32% reduction as compared to the shape graph before leaf pushing. This reduction in the size of the shape graph helps to offset the impact of the associated expansion of the IP prefix table.

As may be seen from FIGS. 8A-8C, use of leaf pushing provides the following benefits: (1) only the terminating vertex of the resulting shape graph maps to valid prefixes; (2) the prefix associated with an IP address is implied by the path of the shape graph traversed using the IP address; and (3) each IP address used as input for traversing the shape graph can only match one IP prefix, which is the longest IP prefix. As a result of these properties, all of the next-hop information can be stored in a single hash table associated with the terminating vertex of the shape graph.

As described herein, the shape graph obtained from a binary prefix trie is smaller in size than the binary prefix trie; however, the IP lookup throughput that is realized while using the shape graph is no better than the IP lookup throughput that is realized while using the binary prefix trie. In general, IP lookup throughput using binary prefix tries may be improved by using a multi-bit trie instead of a single-bit trie. The number of bits of a trie is referred to as the stride (s) of the trie. A multi-bit trie with a stride of s can improve the IP lookup throughput by approximately a factor of s and, further, can reduce the total number of trie nodes of the trie; however, overall memory consumption increases rapidly as the stride size increases because the node size grows exponentially with the stride size and, disadvantageously in terms of memory consumption, this increase in node size significantly outpaces the reduction in the number of trie nodes. As such, the stride of a trie can be balanced against the memory consumption required for the trie.

Figure 9B:
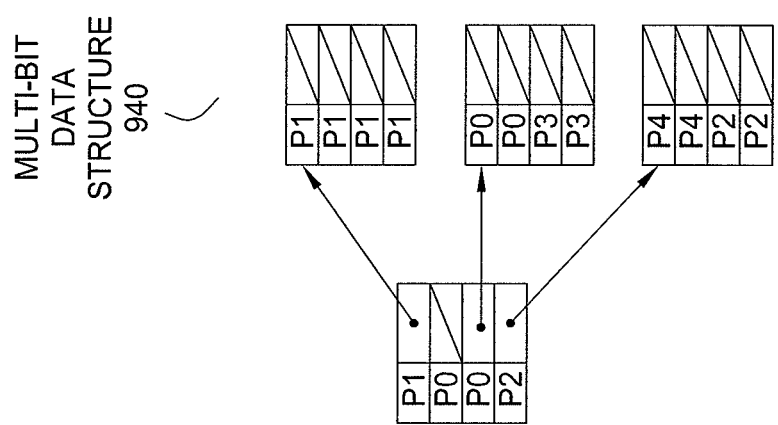
FIG. 9B depicts an exemplary multi-bit data structure for the exemplary multi-bit prefix trie of FIG. 9A.
Figure 9A:
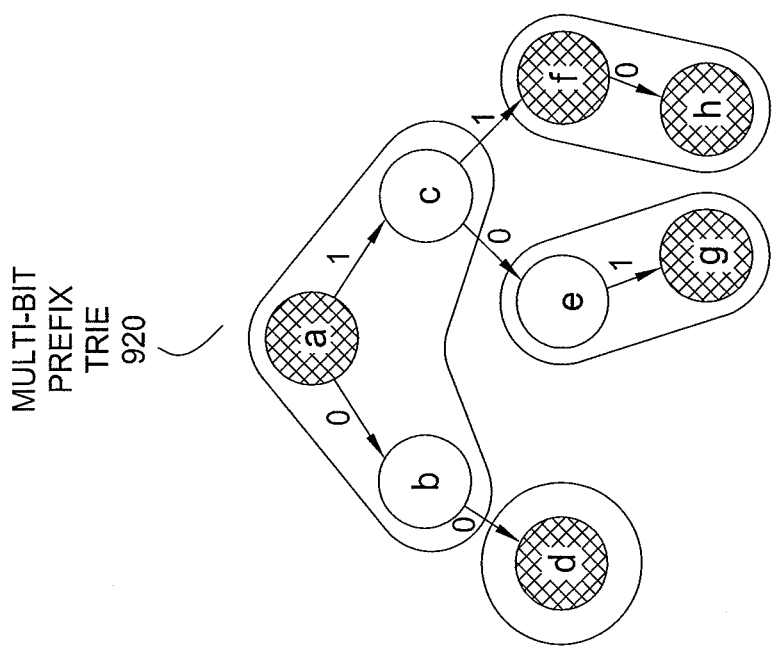
FIG. 9A depicts an exemplary multi-bit prefix trie for the exemplary binary prefix trie of FIG. 1B.

FIG. 9A depicts an exemplary multi-bit prefix trie for the exemplary binary prefix trie of FIG. 1B. As depicted in FIG. 9A, the exemplary multi-bit prefix trie 920 is identical to the exemplary binary prefix trie 120 of FIG. 1B in the arrangement of the nodes and, further, includes groupings of the nodes. The nodes are grouped into four groups as follows: nodes "a", "b", and "c" form a first group, node "d" forms a second group, nodes "e" and "g" form a third group, and nodes "f" and "h" form a fourth group.

FIG. 9B depicts an exemplary multi-bit data structure for the exemplary multi-bit prefix trie of FIG. 9A. As depicted in FIG. 9B, the exemplary multi-bit data structure 940 has a stride of two.

As described herein, multi-bit tries may be used to improve IP lookup throughput and, similarly, multi-bit shape graphs may be used to improve IP lookup throughput. In one embodiment, a multi-bit shape graph is constructed from a binary shape graph, and construction of the multi-bit shape graph is performed in a manner similar to construction of the binary shape graph. In one such embodiment, a multi-bit shape graph is constructed from a binary shape graph as follows: (1) a multi-bit shape graph having a single starting vertex is allocated; (2) with a stride size of s, the binary shape graph is traversed using each of the $2^s$ s-bit patterns from the starting vertex, each finally-reached vertex that is not already present in the multi-bit shape graph is added to the multi-bit shape graph, and the vertices are connected with edges where each edge represents a stride for a different s-bit pattern; (3) step (2) is repeated for each of the newly added vertices; and (4) the process terminates when no vertex can reach vertices other than the terminating vertex.

Figure 10C:
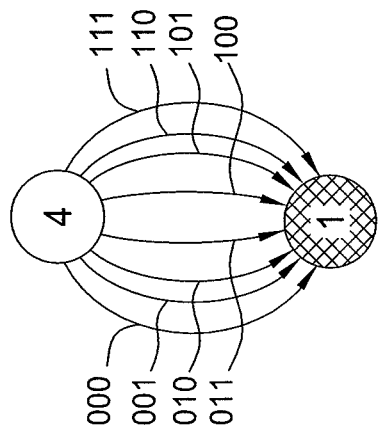
FIG. 10C depicts an exemplary multi-bit shape graph for the exemplary leaf-pushing prefix trie of FIG. 8B, illustrating a stride of three.
Figure 10B:
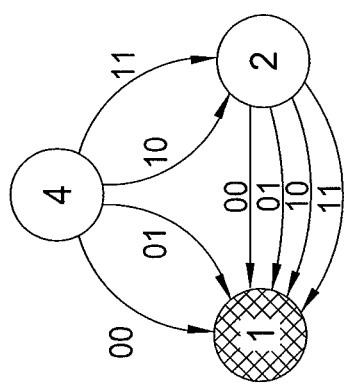
FIG. 10B depicts an exemplary multi-bit shape graph for the exemplary leaf-pushing prefix trie of FIG. 8B, illustrating a stride of two.
Figure 10A:
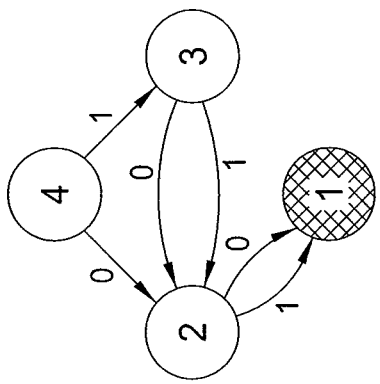
FIG. 10A depicts an exemplary multi-bit shape graph for the exemplary leaf-pushing prefix trie of FIG. 8B, illustrating a stride of one.

FIG. 10A depicts an exemplary single-bit shape graph for the exemplary leaf-pushing prefix trie of FIG. 8B, illustrating a stride of one. As depicted in FIG. 10A, the exemplary single-bit shape graph 1020A, having a stride of one, is a binary shape graph (illustratively, binary shape graph 830 depicted and described with respect to FIG. 8B).

FIG. 10B depicts an exemplary multi-bit shape graph for the exemplary leaf-pushing prefix trie of FIG. 8B, illustrating a stride of two.

As depicted in FIG. 10B, exemplary multi-bit shape graph 1020B includes only three of the four vertices of exemplary single-bit shape graph 1020A (namely, vertices "1", "2", and "4"), and each edge is a 2-bit transition between vertices. In this example, the starting vertex "4" includes two 2-bit edges to terminating vertex "1" (namely, a 00-edge and a 01-edge) and two 2-bit edges to intermediate vertex "2" (namely, a 10-edge and a 11-edge), and the intermediate vertex "2" includes four 2-bit edges to terminating vertex "1" (namely, a 00-edge, a 01-edge, a 10-edge, and a 11-edge). Thus, IP prefix matching may still be performed while enabling a further reduction in the size of the shape graph.

As described herein, exemplary multi-bit shape graph 1020B, having a stride of two, may be obtained by using the exemplary single-bit shape graph 1020A as input.

The exemplary multi-bit shape graph 1020B is obtained as follows.

A starting vertex is allocated (here, starting vertex "4", which is the starting vertex of the exemplary single-bit shape graph 1020A).

The exemplary single-bit shape graph 1020A is traversed a first time using each of the four 2-bit patterns from the starting vertex, and each finally-reached vertex that is not already present in exemplary multi-bit shape graph 1020B (which at this point only include starting vertex "4") is added to the exemplary multi-bit shape graph 1020B. In this step, traversal using the "00" pattern proceeds from vertex "4" to vertex "2" to vertex "1" (the terminating vertex for this pattern). Similarly, traversal of exemplary single-bit shape graph 1020A using the "01", "10", and "11" patterns results in terminating vertices of "1", "2", and "2", respectively. The two terminating vertices have been identified as a result of traversing exemplary single-bit shape graph 1020A: namely, vertex "1" and vertex "2". Thus, vertex "1" and vertex "2" are both added to exemplary multi-bit shape graph 1020B since neither of these vertices is currently included therein. The vertices are then connected with edges corresponding to the four 2-bit patterns used to traverse exemplary single-bit shape graph 1020A. As depicted in FIG. 10B, vertices "4" and "1" are connected using edges 00 and 01 (since vertex "1" of the exemplary single-bit shape graph 1020A was the terminating vertex for these patterns) and vertices "4" and "2" are connected using edges 10 and 11 (since vertex "2" of the exemplary single-bit shape graph 1020A was the terminating vertex for these patterns).

The exemplary single-bit shape graph 1020A is traversed a second time and a third time for the two newly added vertices, respectively (namely, for the vertex "2" and the vertex "1" added to exemplary multi-bit shape graph 1020B during the previous traversal of exemplary single-bit shape graph 1020A). In the second traversal, exemplary single-bit shape graph 1020A is traversed from vertex "2" using each of the four 2-bit patterns, and each finally-reached vertex that is not already present in exemplary multi-bit shape graph 1020B (which at this point includes vertices "4", "2", and "1") is added to the exemplary multi-bit shape graph 1020B. In this step, traversal using each of the four 2-bit patterns proceeds from vertex "2" to vertex "1" (which is the terminating vertex for each of these patterns). Since vertex "1" is already included within the exemplary multi-bit shape graph 1020B, no additional vertices are added to the exemplary multi-bit shape graph 1020B at this point. Since vertex "1" is the terminating vertex for each of the four 2-bit patterns, vertices "2" and "1" are connected using edges 00, 01, 10, and 11 associated with each of the four 2-bit patterns. The third traversal does not need to be performed because vertex "1" is the terminating vertex and, therefore, no additional edges need to be set.

Thus, at this point, construction of exemplary multi-bit shape graph 1020B using exemplary single-bit shape graph 1020A is complete.

FIG. 10C depicts an exemplary multi-bit shape graph for the exemplary leaf-pushing prefix trie of FIG. 8B, illustrating a stride of three.

As depicted in FIG. 10C, exemplary multi-bit shape graph 1020C includes only two of the four vertices of exemplary single-bit shape graph 1020A (namely, vertices "1" and "4"), and each edge is a 3-bit transition from vertex "4" to vertex "1". Thus, IP prefix matching may still be performed while enabling a further reduction in the size of the shape graph.

As described herein, exemplary multi-bit shape graph 1020C, having a stride of three, may be obtained by using the exemplary single-bit shape graph 1020A as input. The process is similar to that described for exemplary multi-bit shape graph 1020B and, as such, is not described in detail for exemplary multi-bit shape graph 1020C.

As depicted in FIGS. 10A-10C, an increase in the stride size of the shape graph results in a decrease in the size of the shape graph and an increase in the number of edges leaving each vertex; however, the increase in the overall memory consumption proceeds at a much slower pace for increases in stride size in multi-bit shape graphs than for increases in stride size of multi-bit tries. Therefore, the multi-bit shape graph is more scalable than the multi-bit trie.

As indicated in FIGS. 9A and 9B, use of multi-bit prefix tries requires prefix expansion, which impacts memory consumption. In general, all of the prefixes are expanded to the closest length l, where l is a multiple of stride s, which results in memory inefficiency. Similarly, the multi-bit shape graph has a similar problem associated therewith. As an example, in exemplary multi-bit shape graph 1020C of FIG. 10C, the two edges 000 and 001 are associated with a single original prefix 00*, but the terminating vertex cannot discern this information so the original prefix 00* is split into the two individual prefixes 000 and 001. With a small stride, such expansion may be tolerable, but as stride becomes larger, the expanded prefix table would become quite large. Further, this problem is exacerbated when multi-bit shape graphs are used in place of multi-bit prefix tries, because, unlike the multi-bit prefix trie where the next-hop information can be embedded into each trie node, the multi-bit shape graph utilizes other constructs to store {prefix, nexthop} pairs (e.g., such as where a hash table is used to store {prefix, nexthop} pairs).

In one embodiment, prefix expansion in multi-bit shape graphs may be reduced or avoided using bitmaps.

In one such embodiment, since each vertex of the multi-bit shape graph (with the exception of the terminating vertex) has $2^s$ outgoing edges, a $2^s$-bitmap is maintained in each vertex with the exception of the terminating vertex. The $2^s$-bitmap maintained for a vertex includes $2^s$ bit positions that are associated with the $2^s$ outgoing edges of the vertex, respectively.

For a given vertex, the bitmap maintained for the vertex indicates which group of edges is associated with the same original prefix, if those edges lead to the terminating vertex. This is possible at least because a prefix always expands to a set of prefixes with consecutive values.

For a given vertex, the bitmap stored for the vertex can be used to infer the actual length of the prefix so as to avoid prefix expansion. If the prefix length is l, the last step of the traversal includes only r=l mod s bits, which expands to $2^{s-r}$ consecutive edges.

In one such embodiment, the process of setting a bitmap for a vertex is as follows. A temporary binary flag is initialized. The temporary binary flag may be initialized to one or zero (for purposes of this description, assume that the temporary flag is initialized to zero). The edges are selected and evaluated consecutively. A first edge is selected. A determination is made as to whether the edge leads to a terminating vertex. If the next t edges (a) lead to the terminating vertex and (b) belong to the same original prefix, the corresponding t bits in the bitmap are set to the current value of the temporary binary flag and then the temporary binary flag is flipped to the other value (from zero to one or from one to zero). If an edge does not lead to the terminative vertex, the corresponding bit in the bitmap is set to the current value of the temporary binary flag and then the temporary binary flag is flipped to the other value (from zero to one or from one to zero). The next edge is then selected and the process continues until all edges have been scanned and all associated bits of the bit map have been set. As a result, a bitmap generated for a vertex includes a string of ones and zeroes corresponding to the $2^s$ outgoing edges of the vertex, respectively. In such a generated bitmap, a string of two or more same-value bits implies that the edges associated with those same-value bits belong to the same prefix.

In an embodiment in which bitmaps are maintained for the vertices of the multi-bit shape graph, the bitmaps may be utilized during IP lookups as needed. During an IP lookup performed using such a multi-bit shape graph, the bitmap of a vertex is used only if the next vertex in traversal of the multi-bit shape graph is the terminating vertex, otherwise the bitmap of the vertex is ignored. Thus, when looking up a prefix in the multi-bit shape graph, if k steps have been traversed and it is determined that the next edge leads to the terminating vertex, then if the corresponding bit for the edge belongs to a string of t ($1 \leq t \leq 2^{s-1}$) consecutive ones (or zeroes) in the bitmap, then the prefix length can be calculated as $s(k+1) - \log_2 t$.

In embodiments in which a multi-bit shape graph is constructed and used to perform IP lookups, the IP lookup process may be modified accordingly. In one embodiment, for example, an IP address being used to perform an IP lookup is used to traverse the multi-bit shape graph to identify the longest IP prefix match for the IP address, e.g., in a manner similar to the manner in which the associated binary prefix trie would be traversed to identify the longest IP prefix match for the IP address. In this embodiment, the IP lookup may be performed as follows: (a) before entering the terminating vertex, the vertex bitmap and the number of traversal steps are used to calculate the length of the best matching IP prefix for the IP address; and (b) the terminating vertex associated with the best matching IP prefix for the IP address is entered; and (c) the best matching prefix is used as a key for retrieving next-hop information associated with the best matching IP prefix (e.g., from a hash table, using a Bloom filter based technique, and the like).

As an example, consider vertex 4 of multi-bit shape graph 1020C in FIG. 10C. In this example, the bitmap associated with vertex "4" should be "00110101" where the first two bits "00" correspond to prefix 00*, the second two bits "11" correspond to prefix 01*, the next bit "0" corresponds to prefix 100*, the next bit "1" corresponds to prefix 101*, the next bit "0" corresponds to prefix 110*, and the next bit "1" corresponds to prefix 111*. In this example, assuming that the multi-bit shape graph 1020C is used to look up an address of "010", then the best matching prefix for the address of "010" may be determined using the bitmap as follows: (1) starting at vertex "4" it is determined that this address corresponds to the third outgoing edge, which leads to the terminating vertex "1"; (2) it is determined that the third bit in the bitmap of vertex "4" is a bit value of "1", which belongs to a string of two consecutive "1"s; (3) from the equation above, the prefix length is calculated as $3 \times (0+1) - \log_2 2 = 2$, and (4) therefore, the best matching prefix is 01*, which may then be used as a key to retrieve next-hop information for address "010".

Thus, the relatively insignificant overhead of $2^s$ bits per vertex enables use of a large stride to increase lookup throughput without a major increase in memory consumption.

In the description above, an assumption is made that the IP forwarding table does not change (for purposes of clarity). In practice, however, an IP forwarding table may change frequently over time (e.g., due to temporal route fluctuations). The incremental updates to an IP forwarding table may include changes such as change of next-hop information, IP prefix insertions and deletions, and the like. The incremental updates to the IP forwarding table must be reflected in the prefix trie, the shape graph, the next-hop information table, and so forth, as necessary, using incremental updates to the prefix trie, the shape graph, the next-hop information table, and so forth, respectively. The incremental updates to the IP forwarding table must be effected using incremental updates to the prefix trie, the shape graph, the next-hop information table, and so forth, due to the high costs of rebuilding and reloading the entire IP lookup data structure in response to each update.

The incremental updating of the IP forwarding table, when it is represented using a shape graph and next-hop information table, may be performed in any suitable manner.

In one embodiment, change of next-hop information is may be effected by modifying the hash table entry for the IP prefix corresponding to the next-hop information.

In one embodiment, IP prefix insertions and deletions may be handled by modifying one or more of the binary prefix trie, the shape graph, and the next-hop table if necessary.

A prefix deletion operation may be performed in any suitable manner. In one embodiment, a prefix deletion may be performed without actually removing any trie nodes from the binary prefix trie and, therefore, the shape graph can remain intact. The only change that needs to be made in this case is to update the next-hop information associated with the deleted prefix. As an example, if the {110* P4} entry is deleted from IP prefix table 810 of FIG. 8C, the only change that needs to be made is to update the next hop of prefix "110*" to P2 in the hash table. The use of such a deletion operation simplifies the operation and saves memory accesses. Additionally, the use of such a deletion operation also may provide benefits for prefix insertions made later, such as, for example, when a prefix is frequently deleted and inserted during route fluctuation and only the hash table needs to be modified for each of the prefix deletion and insertion operations without modifying the shape graph.

A prefix deletion operation may be performed in any suitable manner. In one embodiment, for a binary shape graph, if insertion of a new prefix does not create any new nodes in the binary trie, the binary shape graph will not change and, thus, only the next-hop information needs to be updated; however, if insertion of a new prefix does create one or more new nodes in the binary prefix trie, the binary shape graph is updated accordingly in addition to any updated made to the next-hop information. The number of memory accesses for the update is upper-bounded by the trie depth, because the newly added prefix can only alter the shapes of its ancestor nodes in the binary prefix trie. If a shape identifier of a node is altered to another existing shape identifier, no further modification to the binary shape graph is needed because the connectivity between vertices for the existing shapes has already been established. By contrast, if a shape identifier of a node is altered to a new shape identifier, the node must be updated with the new shape identifier and, as a result, the binary shape graph is updated as follows: a new vertex is added to the binary shape graph and two outgoing edges are set from the new vertex to the two vertices representing the shapes of two child nodes of the new node. This process is repeated, bottom up, until the root of the binary prefix trie is reached. If the shape identifier of the root of the binary prefix trie is new, a new vertex having the new shape identifier is added to the binary shape graph and the new vertex is made the new starting vertex for the binary shape graph. The process for inserting new prefixes in the case of a binary shape graph may be better understood by way of reference to an example. In one embodiment, for a multi-bit shape graph, one incremental prefix update requires, at most, $$\left\lceil \frac{d+1}{s} \right\rceil$$

memory accesses, where d is the binary trie depth and s is the stride.

Figure 11:
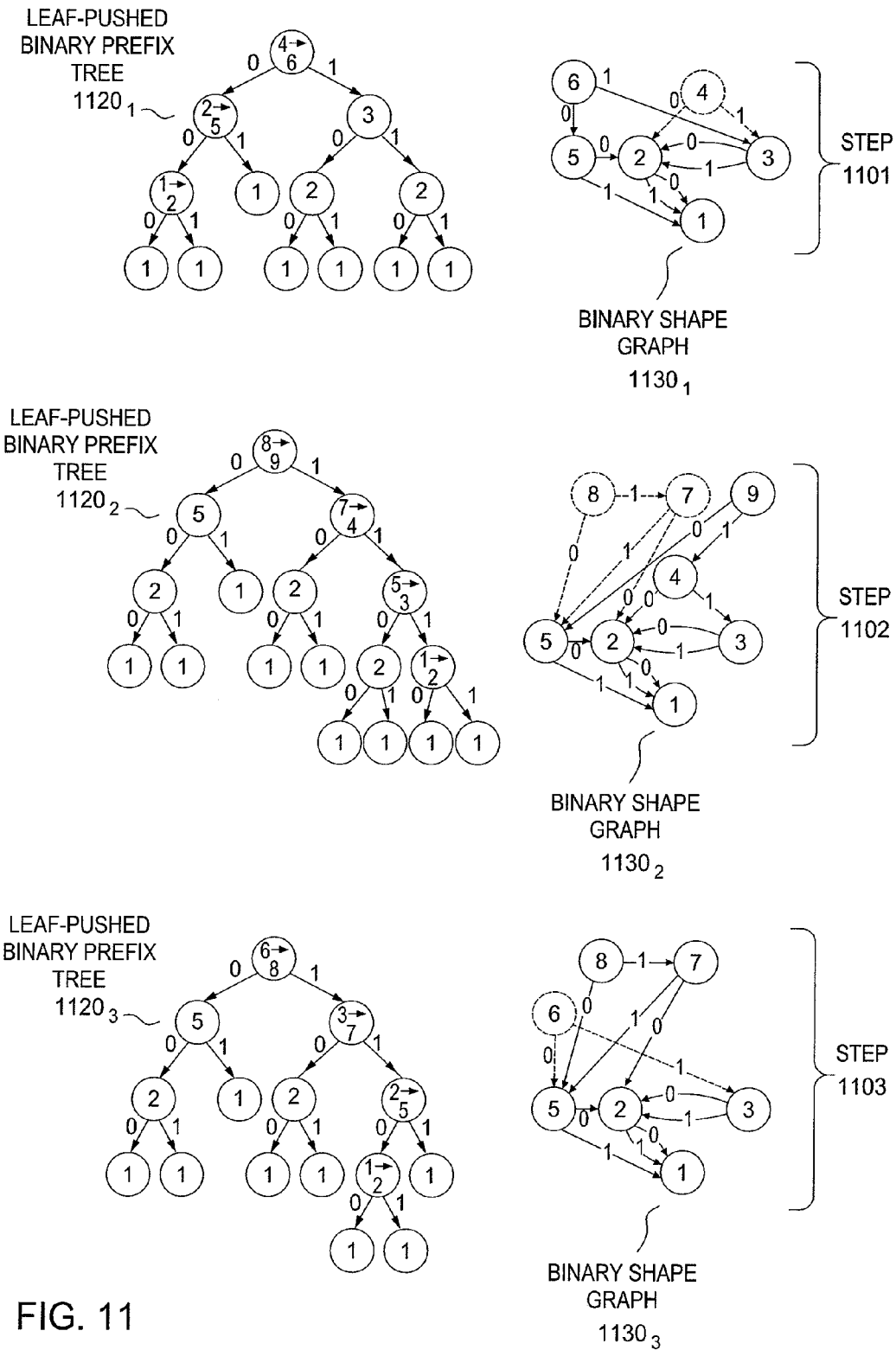
FIG. 11 depicts an exemplary set of prefix tries and an associated set of shape graphs, illustrating a process by which a binary shape graph is incrementally updated in response to an incremental insertion of new prefixes.

FIG. 11 depicts an exemplary set of prefix tries and an associated set of shape graphs, illustrating a process by which a binary shape graph is incrementally updated in response to an incremental insertion of new prefixes.

FIG. 11 depicts incremental insertion of new prefixes "001", "1100*", and "1111*" into leaf-pushed binary prefix trie 820 of FIG. 8A and shape graph 830 of FIG. 8B.

As depicted in FIG. 11, at step 1101, the new prefix "001*" is inserted, which causes: (1) the shape identifier of node "d" to change from "1" to "2" (i.e., an existing shape), (2) the shape identifier of node "b" to change from "2" to "5" (i.e., the shape of the sub-tree rooted at node "b" is new to leaf-pushed binary prefix trie 820), and (3) the shape identifier of node "a" to change from "4" to "6" (i.e., the shape of the sub-tree rooted at node "a" is new to leaf-pushed binary prefix trie 820). The resulting leaf-pushed binary prefix trie $1120_1$ is depicted. The shape graph 830 is modified accordingly based on the changes to leaf-pushed binary prefix trie 820, which includes addition of the new vertices "5" and "6" which correspond to the new sub-tree shapes in the leaf-pushed binary prefix trie 820, and associated updated to edges in shape graph 830. The resulting binary shape graph $1130_1$ is depicted. As depicted in binary shape graph $1130_1$, the vertex "4" is redundant because it is not used in any IP lookups; however, it is not removed from the shape graph at this point since it may be used again later (as depicted in step 1103 of FIG. 11).

As depicted in FIG. 11, at step 1102, the new prefix "1100" is inserted into leaf-pushed binary prefix trie $1120_1$. The insertion of new prefix "1100*" causes associated changes to leaf-pushed binary prefix trie $1120_1$ to form leaf-pushed binary prefix trie $1120_2$, which causes associated changes to the binary shape graph $1130_1$ to form binary shape graph $1130_2$. The leaf-pushed binary prefix trie $1120_2$ and associated binary shape graph $1130_2$ are depicted in FIG. 11.

As depicted in FIG. 11, at step 1103, the new prefix "1111" is inserted into leaf-pushed binary prefix trie $1120_2$. The insertion of new prefix "1111*" causes associated changes to leaf-pushed binary prefix trie $1120_2$ to form leaf-pushed binary prefix trie $1120_3$, which causes associated changes to the binary shape graph $1130_2$ to form binary shape graph $1130_3$. The leaf-pushed binary prefix trie $1120_3$ and associated binary shape graph $1130_3$ are depicted in FIG. 11. As mentioned above, after new prefix "1111*" is inserted, vertex "4" is reused as an internal vertex.

In performing shape graph updates for prefix updates, the memory operations for the shape graph updates are just memory write operations. In one embodiment, when a shape graph update involves a series of memory write operations, the new staring vertex is not activated until all of the memory write operations are complete and, as a result, during this period there is no need to block IP lookups (i.e., the IP lookups continue to start from the old starting vertex until the update is finished). In this case, when the memory write operations are interwoven with normal memory accesses in the same pipeline, the update does not affect the lookup correctness. Similarly, in this case, infrequent updates have little to no impact on IP lookup throughput (e.g., each update to a shape graph with a stride of 6 will need, at most, six memory write operation, such that if there is an update every 1 ms, there will be 6K memory writes per second, which consumes only about 0.003% of the bandwidth of a moderate 200 MHz memory).

As a result of prefix deletions and insertions, some of the vertices of the shape graph may become unused over time. In one embodiment, in order to reduce memory consumption/avoid memory exhaustion, unused vertices of the shape graph may be recycled regularly (e.g., remove the unused vertices from memory and reuse the corresponding shape identifiers for new shapes). This may be performed in any suitable manner, such as by tracking usage of the shape identifiers so that shape identifiers that were previous assigned and then removed may be reassigned before new shape identifiers are used).

As described herein, the shape graph constructed for use in IP lookups may be stored in memory and accessed during IP lookups for determining the matching prefix of an IP address. In general, due to the memory efficiency of the shape graph, the memory consumed by the shape graph should be small enough to fit in the on-chip block memory in network processors, ASICs, FPGAs, and the like. As a result, rather than using a single memory block for a shape graph, multiple memory blocks may be utilized such that the vertices of the shape graph may be spread across the shape graphs in a manner that provides parallelism during IP lookups, and therefore, improves IP lookup throughput.

As such, in one embodiment, the shape graph is deployed on multiple memory blocks for providing parallelization of IP lookups using the shape graph. The deployment of a shape graph on multiple memory blocks may be implemented in any suitable manner (e.g., using any number of memory blocks and deploying any number of shape graph vertices on each of the memory blocks), which may depend on the characteristics of the shape graph being deployed on the multiple memory blocks.

In one such embodiment, the shape graph is deployed on multiple memory blocks in a manner trying to meet the following goal: (a) in a manner for ensuring that each memory block includes approximately the same number of vertices of the shape graph, such that the memory block size can be equalized for easier engineering and better memory efficiency; and (2) in a manner for spreading the vertices of the shape graph across the multiple memory blocks in a way that ensures that lookup accesses to each memory block is equalized in order to increase (and possibly maximize) throughput or reduce (and possibly minimize) the number of outstanding packets needed to consume the bandwidth.

This problem is similar to the classical bin packing problem in which one tries to pack a set of variable sized items into the minimum number of fixed-capacity bins; however, the difference between the classical bin packing problem and achieving the most efficient deployment of vertices of a shape graph across multiple memory blocks is that the problem of deploying vertices of a shape graph across multiple memory blocks is equivalent to a situation in which there is a fixed number of bins (i.e., memory blocks) with unlimited capacity and the goals listed above must be satisfied.

In one embodiment, in order to solve such a problem, the following procedure is used. An assumption is made that each vertex of the shape graph is associated with a weight which indicates the probability that the vertex will be accessed during an IP lookup. A min-max heuristic is used to assign each vertex of the shape graph to one of the k multiple memory blocks. The vertices are sorted in decreasing weight order and then each vertex is assigned in the current least weighted memory block according to the weight order. The process is repeated until all vertices have been assigned to one of the k memory blocks.

In this process, the starting vertex and terminating vertex are omitted, because (1) it is not necessary to ever actually access the terminating vertex (i.e., the matching prefix for an IP address can be determined at the vertex that is one step before the terminating vertex), and (2) the starting vertex is the most weighted vertex because it is accessed on every IP lookup (and can be handled in the control logic, rather than in the memory, in order to save memory bandwidth consumption).

The weights can be assigned to the vertices in any suitable manner.

In one embodiment, the weights can be assigned to the vertices statically (e.g., by assuming that each prefix in the next-hop information table is accessed with the same frequency). In this static weights embodiment, the weights of each of the vertices are initialized to zero and then, for each prefix, the weight of each vertex of the shape graph that is accessed when the shape graph is traversed for the prefix is incremented by one (i.e., a vertex with a weight of w indicates that there are w prefixes that traverse that vertex). In practice however, this assumption for the static weights embodiment is not always true, i.e., prefix access is often fairly imbalanced (and in many cases a majority of the IP lookups that are performed may be concentrated on a small subset of the IP prefixes). Thus, in another embodiment, weights can be assigned to the vertices dynamically. In one dynamic weights embodiment, the access rate of each vertex of the shape graph is tracked dynamically and the associated weights of the vertices are updated accordingly. In response to a determination that the vertices may be distributed across the memory blocks more efficiently, the distribution of vertices is modified by moving one or more of the vertices to different host memory blocks. In this manner, the dynamic weights embodiment enables memory accesses to be balanced across the memory blocks dynamically on the fly.

In general, the max-min heuristic works well for a shape graph with static vertex weights. For example, for the AS1221 prefix table, assuming four or eight memory blocks are used, the maximum deviation of the overall weight in any memory block is less than ten from the average (reflecting the bandwidth balance) and the maximum deviation of the number of vertices in any memory block is at most a few tens from the average (reflecting the memory size balance), both of which are negligibly small.

In theory, with a perfect vertex distribution, $$\left\lceil \frac{d+1}{s} \right\rceil - 2$$

memory blocks are enough to support finishing a lookup in just one clock cycle in the worst case, where d is the length of the longest prefix (e.g. 32 in the case of IPv4) and s is the stride. The deduction of "2" in the equation above is due to the fact that neither the starting vertex nor the terminating vertex is actually stored in the memory. As an example, this means that four memory blocks are sufficient for stride size of six.

In one embodiment, rather than using the minimum possible number of memory blocks for distributing the vertices of the shape graph, one or more additional memory blocks (i.e., in addition to the minimum number required) may still be employed. The use of such additional memory blocks may provide additional advantaged, such as increasing the tolerance for temporal access imbalance. The use of one or more additional memory blocks in this manner will not increase memory consumption, since each memory block will hold fewer vertices proportionally.

As an example, where IP lookups are performed for IP packets being dispatched at a router, deployment of the shape graph across multiple memory blocks enables dispatching of multiple IP packets for performing multiple IP lookups on the multiple IP packets contemporaneously. In this example, each memory access retrieves a pointer giving the memory block identifier and memory block offset for the next memory access. This process continues until the terminating vertex is reached, at which point the matching prefix for the IP address is derived from traversal of the shape graph and the matching prefix is used to search the next-hop information table (which may be provided as an off-chip table). This example may be better understood by way of reference to FIG. 12.

Figure 12:
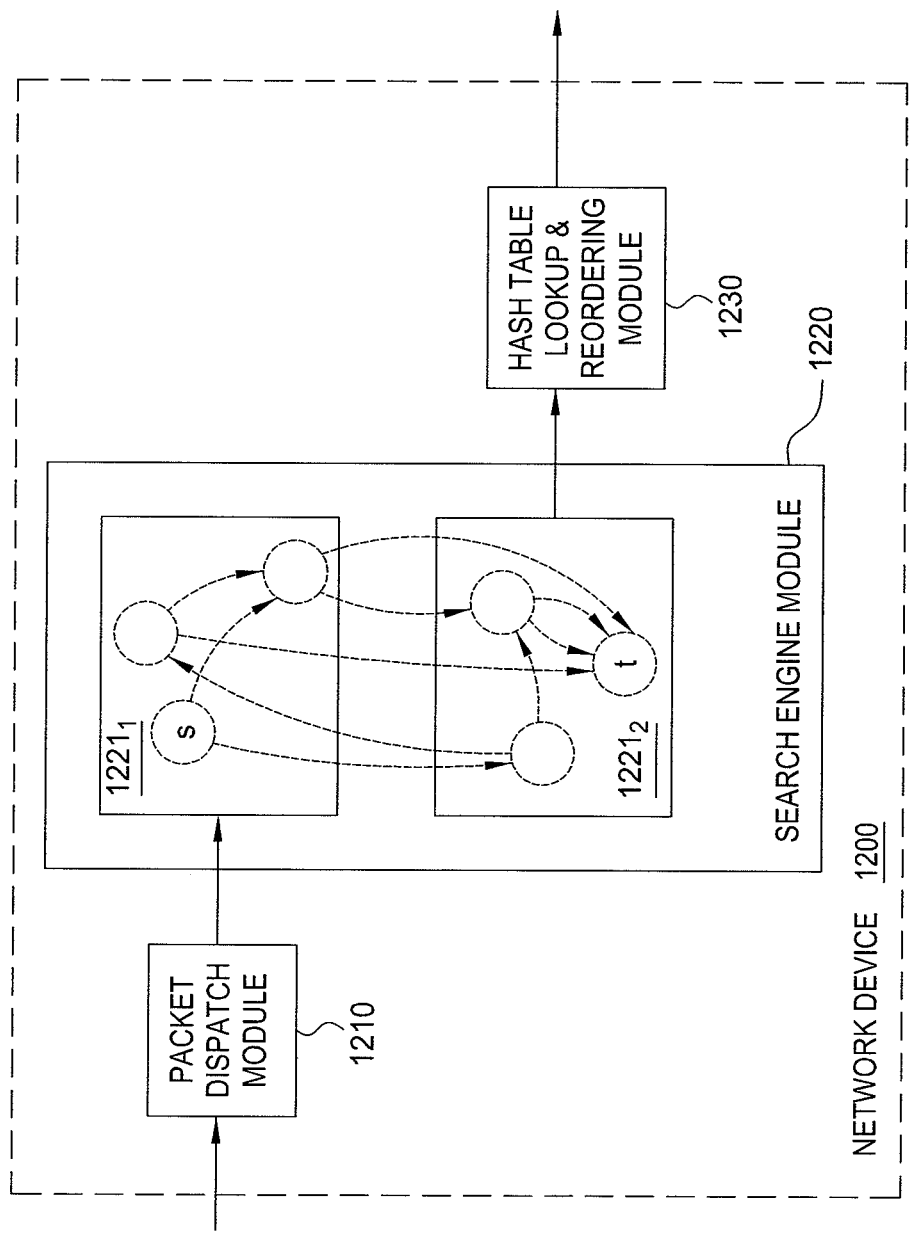
FIG. 12 depicts an exemplary network device illustrating use of multiple memory blocks to support use of a shape graph in performing IP lookups.

FIG. 12 depicts an exemplary network device illustrating use of multiple memory blocks to support use of a shape graph in performing IP lookups. As depicted in FIG. 12, network device 1200 includes a packet dispatch module 1210, a search engine module 1220 having a pair of memory blocks $1221_1$ and $1221_2$ (collectively, memory blocks 1221), and a hash table lookup and reordering module 1230. The packet dispatch module 1210 dispatches IP packets to search engine module 1220 for performing IP lookups for the IP packets. The search engine module 1220 performs the IP lookups for the IP packets using a shape graph stored in memory blocks 1221. The shape graph includes six vertices, where three of the vertices are deployed on memory block $1221_1$ (illustratively, the starting vertex S and two intermediate vertices) and three of the vertices are deployed on memory block $1221_2$ (illustratively, the terminating vertex T and two intermediate vertices). The search engine module 1220 provides the IP lookup results from the IP lookups on the IP packets to the hash table lookup and reordering module 1230. The hash table lookup and reordering module 1230 performs lookups to determine next-hop information for the IP packets based on the results of the IP lookups for the IP packets. The hash table lookup and reordering module 1230 also may need to provide reordering of IP lookup results received from search engine module 1220 since each IP packet provided to search engine module 1220 may need a different number of memory accesses to complete the IP lookup such that the IP lookup results may be provided to hash table lookup and reordering module 1230 out of order with respect to the order in which the associated IP packets are provided from the packet dispatch module 1210 to the search engine module 1220. It will be appreciated that network device 1200 is provided for purposes of illustrating use of multiple memory blocks to perform IP lookups, and in no way constrains the scope of the IP lookup capability depicted and described herein. As such, the network devices on which the IP lookup capability may be provided may be implemented in any other suitable manner.

As described herein, 100 GbE is being standardized, and routers with 100 GbE line cards need to be able to process approximately 150 million packets per second per port in the worst case. The current FPGAs, ASICs, and memory components that are currently available can comfortably operate at 300 MHz, which means that at least two clock cycles are available to finish one forwarding lookup decision. The multiple memory block architecture can easily sustain such throughput and, further, has potential to support even higher line speeds.

As described herein, the processes and associated data structure(s) used for performing IP lookups may be implemented in any suitable manner, which include functions such as generation of the shape graph, determination of a matching prefix for an IP address using the shape graph, retrieval of next-hop information for an IP address using a matching prefix determined for the IP address, and the like.

In one embodiment, retrieval of next-hop information for an IP address using a matching prefix may be performed using a hash table implementation. A hash table may be implemented in any suitable manner. The performance of the hash table may have a direct impact on both storage and lookup throughput, and there are many ways to implement the hash table efficiently with compact storage and low collision probability. In one embodiment, for example, k independent hash functions are used, and each table bucket has n slots to hold up to n {prefix,nexthop} pairs. In this embodiment, each prefix is hashed k times into k candidate buckets, but is stored only in the lightest loaded bucket. As a result, an IP lookup operation needs to access the hash table k times using the k hash functions, and all prefixes stored in the k accessed buckets need to be compared to find the match. By using multi-port memory or multiple parallel memory modules, such memory accesses also can be parallelized. With fine tuned parameters, the hash table may be quite compact with an extremely low overflow rate. In the rare case that a prefix cannot find an empty slot to store in the selected buckets, the prefix is treated as an exception and stored in a small on-chip TCAM. As an example, for the AS1221 table after leaf pushing, a hash table with the number of buckets being half of the number of prefixes may be used, and the number of independent hash functions and number of slots may be set as k=4 and n=3, respectively. In many different trials, each with different hash functions, there are typically less than ten overflow prefixes. In this case, assuming that each prefix,nexthop} pair uses five bytes (a 4-byte prefix and a 1-byte next hop), then, on the average, a prefix consumes a 60-bit memory, such that the total memory consumed by the hash table is t 21.5 Mb. Although primarily described with respect to a particular hash table implementation, it will be appreciated that any other suitable hash table implementations may be employed.

In one embodiment, retrieval of next-hop information for an IP address using a matching IP prefix may be performed using a Bloom filter based implementation. In one embodiment, for example, IP prefix matching may be performed using an efficient Bloom filter based data structure that can directly return the identifier of the group to which an element belongs. In one such embodiment, for example, given an IP address, the shape graph is traversed to determine the best matching IP prefix for the IP address. In this embodiment, the IP prefixes can be grouped and stored according to their next-hop output port, such that identification of the best matching IP prefix for the IP address will directly return the identifier of the next-hop output port for the IP address. This type of implementation has the potential to further reduce memory consumed during IP lookups.

Although primarily depicted and described with respect to use of hash table based and Bloom filter based implementations of IP lookups, it will be appreciated that any other techniques suitable for use in performing IP lookups may be employed.

As described herein, the shape graph capability is adapted for use within IPv4 IP addresses and IPv6 IP addresses. In general, a binary prefix trie for IPv6 includes many more nodes than a binary prefix trie for IPv4 and, thus, data structure scalability is even more critical for IPv6 than for IPv4. The shape graph is much smaller than and scales better than the multi-bit trie for all strides. Furthermore, with respect to IP lookups, IPv6 poses additional challenges to the Bloom filter based algorithms (e.g., due to the large number of unique prefix lengths), and limiting the number of Bloom filters would cause a much larger prefix expansion factor. Thus, the shape graph capability depicted and described herein may outperform the Bloom filter based algorithms even more significantly for IPv6 than for IPv4.

As described herein, the shape graph capability exploits characteristics of the IP forwarding table to construct a compact IP lookup data structure that scales to large forwarding tables, outperforming both multi-bit trie IP lookup algorithms and Bloom filter based IP lookup algorithms. As an example, for IP lookups on a BGP table having more than 200K prefixes, with a memory consumption of only about 100 bits per prefix (including on-chip and off-chip memory), the shape graph capability can support line-speed lookup for 100 Gbps line speed.

As described herein, generation of a shape graph from a binary prefix trie may be performed by the device for which the shape graph is intended (e.g., by the router on which the shape graph is to be stored for use by the router in performing IP lookups) or by a control device on behalf of the device for which the shape graph is intended (e.g., by a management system which then provides the shape graph to the device on which the shape graph is to be stored for use in performing IP lookups).

With respect to the device on which the IP lookup capability is supported, the IP lookup capability depicted and described herein may be implemented in any suitable manner, e.g., in FPGAs, ASICs, processors, and the like, as well as combinations thereof.

Figure 13:
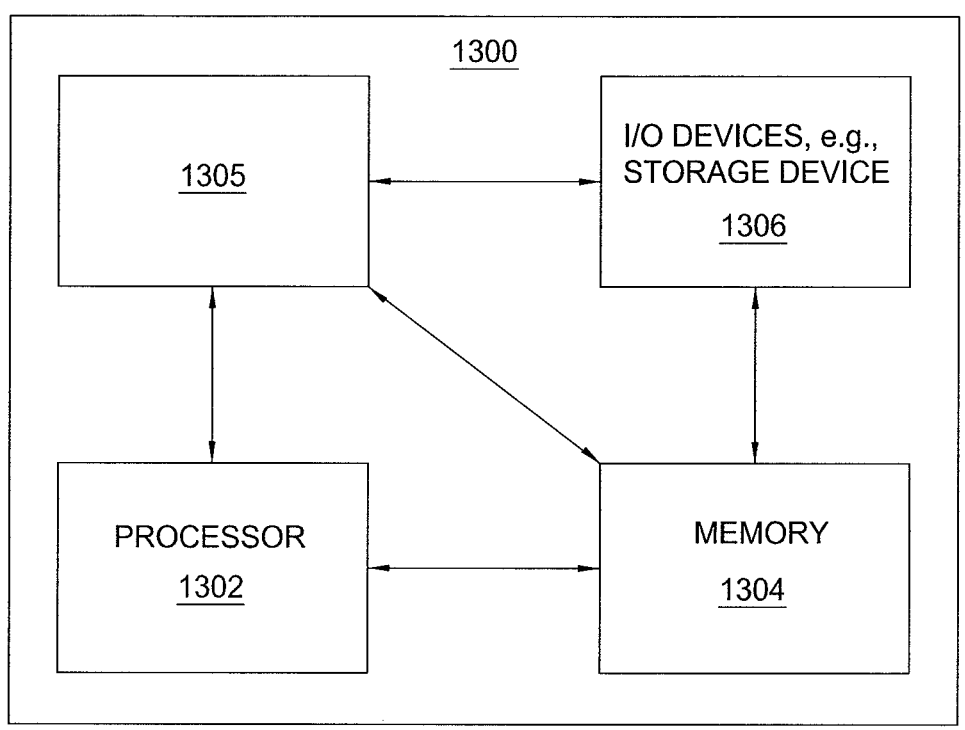
FIG. 13 depicts a high-level block diagram of a computer suitable for use in performing the functions described herein.

An exemplary computer for use in providing the IP lookup capability is depicted and described with respect to FIG. 13.

FIG. 13 depicts a high-level block diagram of a computer suitable for use in performing the functions described herein. As depicted in FIG. 13, computer 1300 includes a processor element 1302 (e.g., a central processing unit (CPU) and/or other suitable processor(s)), a memory 1304 (e.g., random access memory (RAM), read only memory (ROM), and the like), a shape graph module 1305, and various input/output devices 1306 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It should be noted that functions depicted and described herein may be implemented in software and/or in a combination of software and hardware, e.g., using a general purpose computer, one or more application specific integrated circuits (ASIC), and/or any other hardware equivalents. In one embodiment, lookup shape graph process 1305 can be loaded into memory 1304 and executed by processor 1302 to implement the functions as discussed herein above (e.g., construction of a shape graph, use of a shape graph to lookup data values, and the like, as well as combinations thereof). As such, shape graph process 1305 (including any associated data structures, such as the prefix trie, shape graph, lookup information table(s), and the like) can be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although primarily depicted and described herein with respect to use of the IP lookup capability in a router, the IP lookup capability may be used in any network element(s) suitable for constructing a shape graph for use in performing IP lookups and/or suitable for use in performing IP lookups (e.g., such as where a shape graph is constructed on and used on a router, where a shape graph is constructed on a management system and used on a router, and the like).

Although primarily depicted and described herein within the context of generating a shape graph for a binary prefix trie that represents a set of IP prefixes for use in identifying matching IP prefixes for use in performing IP lookups, a shape graph may be generated for any suitable binary trie which may represent any suitable type of information.

Although primarily depicted and described herein with respect to using a shape graph to identify matching IP prefixes for use in performing IP lookups, a shape graph may be used to perform any suitable type of lookups (which will depend, at least in part, on the type of information represented by the binary trie from which the shape graph is generated).

Although various embodiments which incorporate the teachings of the present invention have been shown and described in detail herein, those skilled in the art can readily devise many other varied embodiments that still incorporate these teachings.

What is claimed is:

1. A method for representing a binary trie, the binary trie representing a set of values and comprising a plurality of leaf node and a plurality of non-leaf nodes, the method comprising:

using a processor and a memory for:
determining, for each of the plurality of non-leaf nodes of the binary trie, a shape of a respective sub-tree rooted at the non-leaf node of the binary trie;
constructing a shape graph from the binary trie based on the shapes of the sub-trees rooted at the non-leaf nodes of the binary trie, wherein the shape graph represents the set of values, wherein the shape graph comprises:
a terminating vertex that represents the plurality of leaf nodes of the binary trie; and
a plurality of vertices that represent a respective plurality of unique shapes of the sub-trees rooted at the non-leaf nodes of the binary trie, wherein the plurality of vertices comprises a first vertex, and wherein the first vertex represents a first shape of at least a first sub-tree rooted at a first non-leaf node of the binary trie and a second sub-tree rooted at a second non-leaf node of the binary trie; and
storing the shape graph.

2. The method of claim 1, wherein the shape graph further comprises a plurality of edges indicative of transitions between the vertices for use in traversing the shape graph for performing value lookups.

3. The method of claim 1, further comprising:
for each non-leaf node of the binary trie, labeling the non-leaf node of the binary trie using a respective shape label indicating the shape of the sub-tree rooted at the non-leaf node.

4. The method of claim 3, wherein the determining and the labeling are performed in a single-pass traversal of the binary trie.

5. The method of claim 4, wherein the single-pass traversal of the binary trie is a post-order traversal.

6. The method of claim 4, wherein the single-pass traversal of the binary trie is performed in a direction from the leaf nodes toward a root node of the binary trie, wherein performing the determining and the labeling in the single-pass traversal of the binary trie comprises:
assigning a first shape identifier for the leaf nodes and labeling the leaf nodes using a respective plurality of shape labels indicating the first shape identifier; and
for each of the non-leaf nodes of the binary trie:
determining a pair of labels assigned to the two child nodes of the non-leaf node; and
querying a table using the pair of labels, wherein:
based on a determination that the pair of labels is not identified in the table, assigning an unused shape identifier to the non-leaf node, storing the pair of labels and the unused shape identifier associated with the pair of labels in the table, and labeling the non-leaf node with the assigned shape identifier; or
based on a determination that the pair of labels is identified in the table, retrieving from the table a shape identifier associated with the pair of labels, and labeling the non-leaf node with the retrieved shape identifier.

7. The method of claim 6, wherein, when determining the pair of labels assigned to the two child nodes of a non-leaf node, a non-existent child node is assumed to have a null shape identifier.

8. The method of claim 1, further comprising:
labeling the leaf nodes and the non-leaf nodes of the binary trie to form thereby a labeled binary trie, where each non-leaf node of the labeled binary trie has associated therewith a respective shape label indicative of the shape of the sub-tree rooted thereat;
wherein constructing the shape graph for the binary trie comprises:
allocating the vertices for the shape graph; and
traversing the labeled binary trie in a manner for determining a plurality of edges to be set between the vertices of the shape graph.

9. The method of claim 8, wherein allocating the vertices for the shape graph comprises:
allocating k vertices for the shape graph, wherein k is a number of unique sub-tree shapes determined from the binary trie.

10. The method of claim 9, wherein k is determined from a shape label of the root node of the labeled binary trie.

11. The method of claim 8, wherein the binary trie is traversed in any order.

12. The method of claim 8, wherein traversing the labeled binary trie in a manner for determining a plurality of edges to be set between the vertices of the shape graph comprises:
traversing the labeled binary trie in a manner for visiting at least a portion of the nodes of the labeled binary trie, wherein, for a visited one of the nodes of the labeled binary trie:
based on a determination that a shape label of the visited one of the nodes has been encountered already, continuing to a next one of the nodes of the labeled binary trie; or
based on a determination that a shape label of the visited one of the nodes has not been encountered already:
determining a shape label of a 0-branch child node of the visited one of the nodes and determining a shape label of a 1-branch child node of the visited one of the nodes (t); and
setting, in the directed shape graph, a directed 0-edge from a vertex associated with the shape label of the visited one of the nodes to a vertex associated with the shape label of the 0-branch child node of the visited one of the nodes; and
setting, in the directed shape graph, a directed 1-edge from a vertex associated with the shape label of the visited one of the nodes to a vertex associated with the shape label of the 1-branch child node of the visited one of the nodes.

13. The method of claim 1, wherein the set of values is a subset of a full set of values representable by a full binary trie, wherein the binary trie is a full binary trie including all nodes independent of whether the values indicated by the nodes of the full binary trie are included within the set of values.

14. The method of claim 1, further comprising:
modifying the binary trie, prior to constructing the shape graph, using leaf pushing.

15. The method of claim 1, further comprising:
modifying the shape graph to form a multi-bit shape graph.

16. The method of claim 1, wherein the set of values is a set of IP prefixes for use in performing IP lookups.

17. The method of claim 16, further comprising:
traversing the shape graph, using at least a portion of an IP address, for determining a matching IP prefix associated with the IP address.

18. The method of claim 17, further comprising:
determining next hop information for the IP address based on the matching IP prefix of the IP address.

19. An apparatus for representing a binary trie, the binary trie representing a set of values and comprising a plurality of leaf node and a plurality of non-leaf nodes, the apparatus comprising:
a processor and a memory communicatively connected to the processor, the processor configured to:
determine, for each of the plurality of non-leaf nodes of the binary trie, a shape of a respective sub-tree rooted at the non-leaf node of the binary trie;
construct a shape graph from the binary trie based on the shapes of the sub-trees rooted at the non-leaf nodes of the binary trie, wherein the shape graph represents the set of values, wherein the shape graph comprises:
a terminating vertex that represents the plurality of leaf nodes of the binary trie; and
a plurality of vertices that represent a respective plurality of unique shapes of the sub-trees rooted at the non-leaf nodes of the binary trie, wherein the plurality of vertices comprises a first vertex, and wherein the first vertex represents a first shape of at least a first sub-tree rooted at a first non-leaf node of the binary trie and a second sub-tree rooted at a second non-leaf node of the binary trie; and
store the shape graph.

20. A method for performing a lookup for identifying a matching value from a set of values represented using a binary trie, the method comprising:

using a processor and a memory for:
traversing a shape graph for identifying the matching value, wherein the shape graph represents the set of values, wherein the shape graph comprises:
a terminating vertex that represents the plurality of leaf nodes of the binary trie; and
a plurality of vertices that represent a respective plurality of unique shapes of the sub-trees rooted at the non-leaf nodes of the binary trie, wherein the plurality of vertices comprises a first vertex, and wherein the first vertex represents a first shape of at least a first sub-tree rooted at a first non-leaf node of the binary trie and a second sub-tree rooted at a second non-leaf node of the binary trie; and
determining the matching value based at least in part on traversal of the shape graph.

* * * * *